(12) United States Patent
Kumar et al.

(10) Patent No.: US 10,817,441 B2
(45) Date of Patent: Oct. 27, 2020

(54) SHARED ACCELERATOR MEMORY SYSTEMS AND METHODS

(71) Applicant: INTEL CORPORATION, Santa Clara, CA (US)

(72) Inventors: Sanjay Kumar, Hillsboro, OR (US); David Koufaty, Portland, OR (US); Philip Lantz, Cornelius, OR (US); Pratik Marolia, Hillsboro, OR (US); Rajesh Sankaran, Portland, OR (US); Koen Koning, Amsterdam (NL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/370,587

(22) Filed: Mar. 29, 2019

(65) Prior Publication Data
US 2020/0310993 A1    Oct. 1, 2020

(51) Int. Cl.
*G06F 13/16* (2006.01)
*G06F 12/1027* (2016.01)
*G06F 3/06* (2006.01)

(52) U.S. Cl.
CPC ........ *G06F 13/1668* (2013.01); *G06F 3/0604* (2013.01); *G06F 3/0647* (2013.01);
(Continued)

(58) Field of Classification Search
None
See application file for complete search history.

(56) References Cited

U.S. PATENT DOCUMENTS 7,827,383 B2 * 11/2010 Spracklen ........... G06F 12/1036
710/4
10,324,858 B2 * 6/2019 Mathewson ........ G06F 12/1036
(Continued)

FOREIGN PATENT DOCUMENTS

EP    3385850    10/2018

OTHER PUBLICATIONS

Intel® 64 and IA-32 Architectures Software Developer's Manual, Sep. 2014.
(Continued)

*Primary Examiner* — Henry Tsai
*Assistant Examiner* — Aurangzeb Hassan
(74) *Attorney, Agent, or Firm* — Trop, Pruner & Hu, P.C.

(57) ABSTRACT

The present disclosure is directed to systems and methods sharing memory circuitry between processor memory circuitry and accelerator memory circuitry in each of a plurality of peer-to-peer connected accelerator units. Each of the accelerator units includes virtual-to-physical address translation circuitry and migration circuitry. The virtual-to-physical address translation circuitry in each accelerator unit includes pages for each of at least some of the plurality of accelerator units. The migration circuitry causes the transfer of data between the processor memory circuitry and the accelerator memory circuitry in each of the plurality of accelerator circuits. The migration circuitry migrates and evicts data to/from accelerator memory circuitry based on statistical information associated with accesses to at least one of: processor memory circuitry or accelerator memory circuitry in one or more peer accelerator circuits. Thus, the processor memory circuitry and accelerator memory circuitry may be dynamically allocated to advantageously minimize system latency attributable to data access operations.

20 Claims, 20 Drawing Sheets

(52) U.S. Cl.
CPC .......... *G06F 3/0653* (2013.01); *G06F 3/0673* (2013.01); *G06F 12/1027* (2013.01); *G06F 2212/657* (2013.01); *G06F 2212/683* (2013.01)

(56) References Cited

U.S. PATENT DOCUMENTS

| | | | | |
|---|---|---|---|---|
| 2009/0150620 A1* | 6/2009 | Paver | ................... | G06F 9/3879 |
| | | | | 711/146 |
| 2009/0193197 A1* | 7/2009 | Stevens | ............... | G06F 12/0804 |
| | | | | 711/141 |
| 2011/0161620 A1 | 6/2011 | Kaminski et al. | | |
| 2013/0311738 A1* | 11/2013 | Jiang | ................... | G06F 12/1466 |
| | | | | 711/163 |
| 2014/0281299 A1 | 9/2014 | Duluk et al. | | |
| 2017/0109281 A1* | 4/2017 | Weissmann | ......... | G06F 12/1027 |
| 2017/0286122 A1* | 10/2017 | Wu | ....................... | G06F 9/3877 |
| 2018/0373641 A1 | 12/2018 | Rana et al. | | |

OTHER PUBLICATIONS

Intel® Architecture Instructions Set Extensions and Future Features Programming Reference, Mar. 2020.
European Patent Office, European Search Report dated Aug. 4, 2020 in European patent application No. 20157805.1, 9 pages total.
Zheng Tianhao, et al., "Towards High Performance Paged Memory For GPUs," IEEE Mar. 12, 2016, 14 pages total.

* cited by examiner

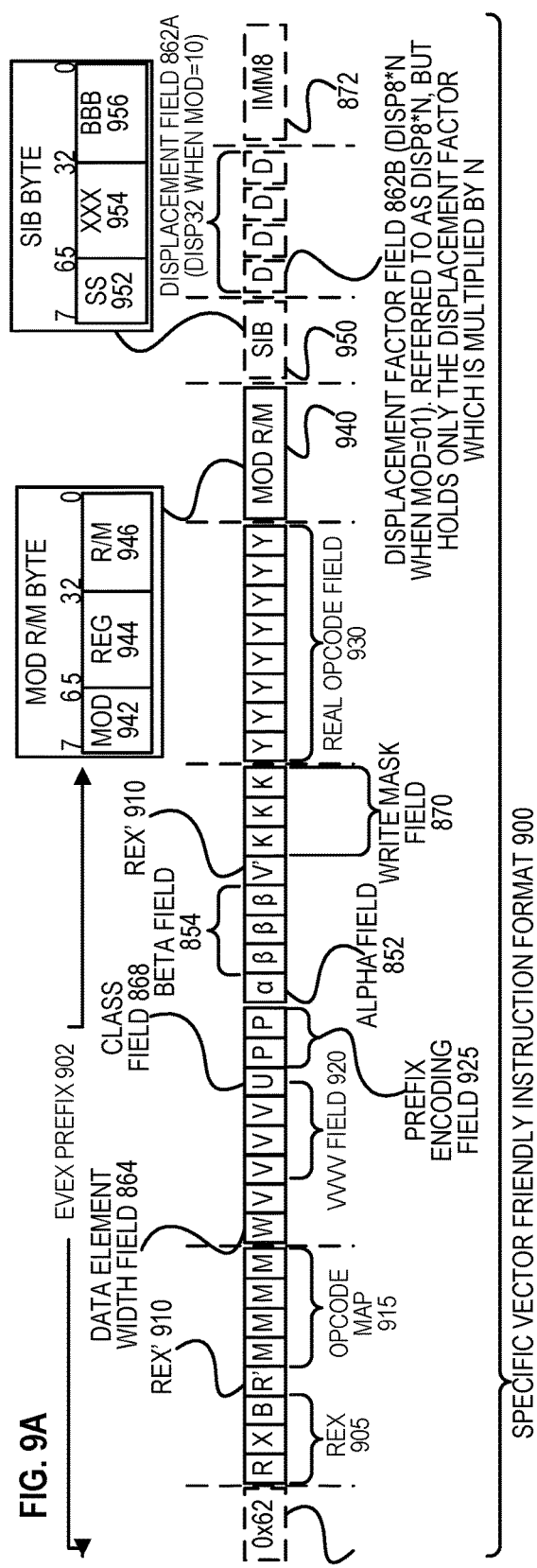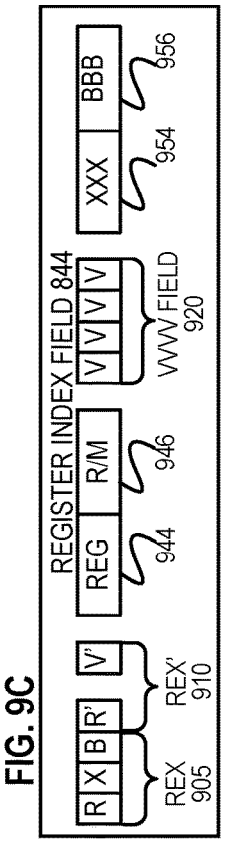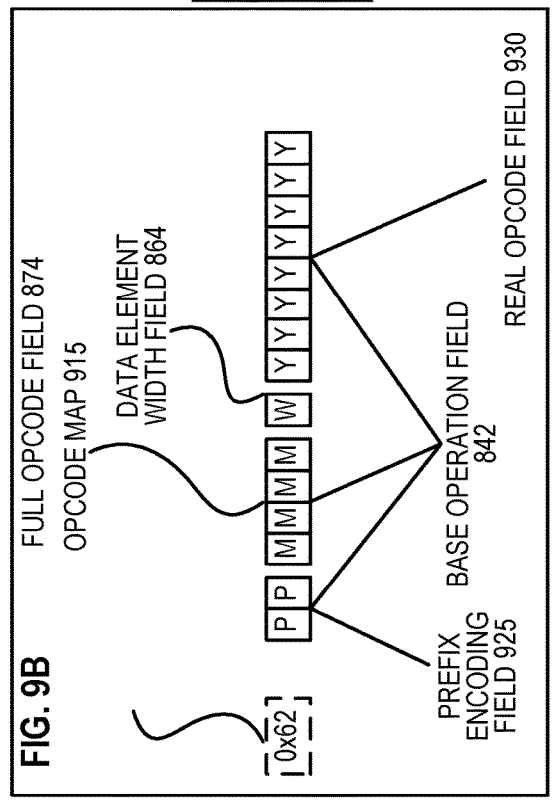

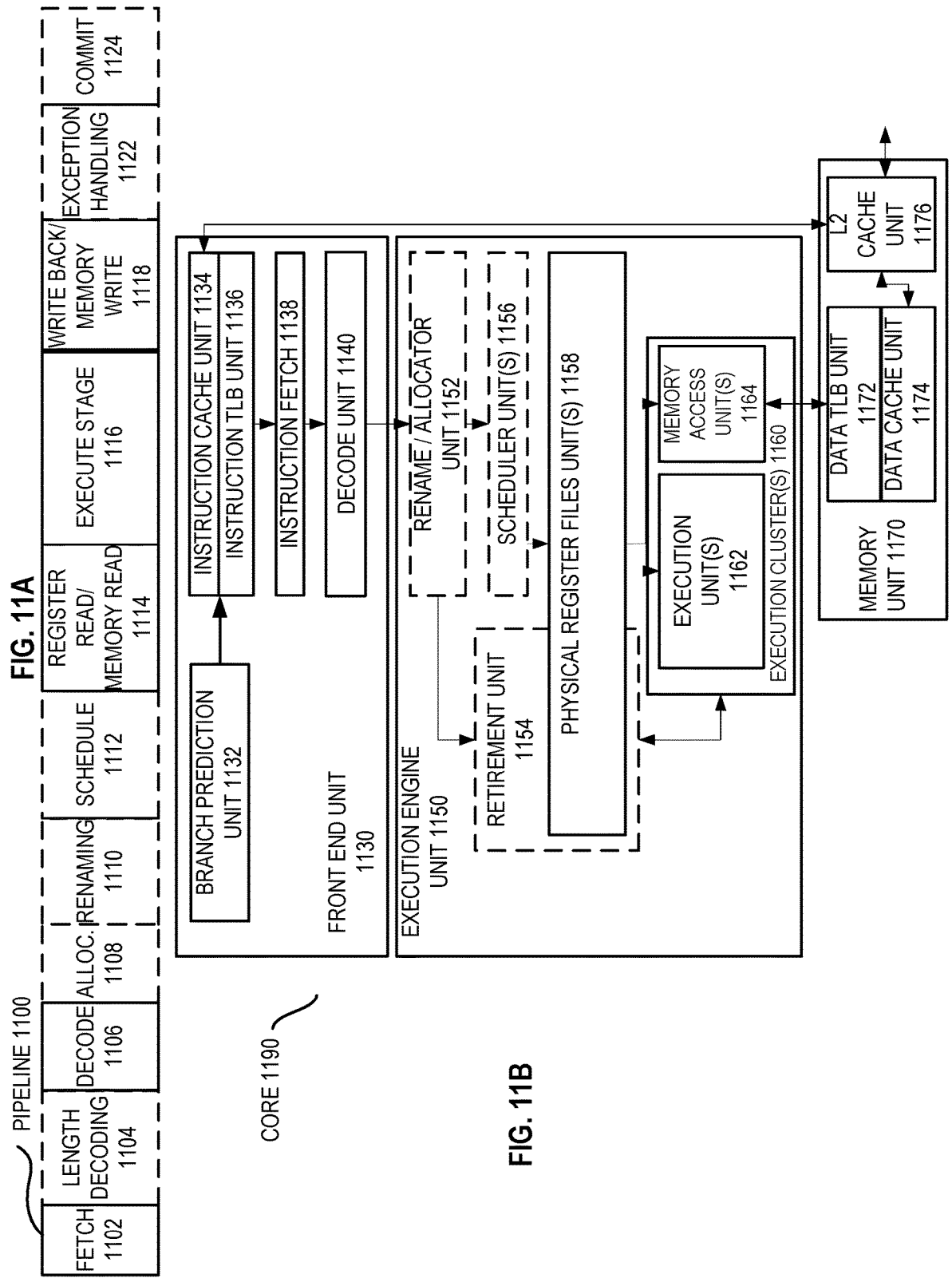

US 10,817,441 B2

SHARED ACCELERATOR MEMORY SYSTEMS AND METHODS

TECHNICAL FIELD

The present disclosure relates to shared data storage, more specifically to peer-to-peer shared accelerator memory.

BACKGROUND

Many modern heterogeneous compute platforms include one or more host processors coupled to a plurality of compute accelerators (general purpose graphics processing unit (GPGPU); field programmable gate arrays (FPGAs); tensor processing units (TPUs). High-speed memory (e.g., DRAM) may exist within the processor and high-speed/bandwidth memory (e.g., HBM) may exist within each of the plurality of compute accelerators. Such high-speed memory offers significantly reduced access times over host system memory accessed via one or more host buses (e.g., PCIe bus). Thus, significant advantages may exist where frequently accessed data is maintained in memory proximate the point of use (e.g., the processor or compute accelerators) rather than simply held in system memory that is accessed only via a relatively slow host system bus. For example, modern programmable parallel accelerators, such as GPGPUs, may include ~900 gigabits/sec (GB/s) of bandwidth to GPGPU (or device) memory compared to ~30 GB/s (PCIe Gen 3×16) to host or system memory. To realize the peak performance of a compute accelerator, the majority of the data accesses performed by the accelerator should be serviced using accelerator memory.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIGS. 9A, 9B, 9C, and 9D are block diagrams illustrating an exemplary specific vector friendly instruction format according to embodiments of the invention;

FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention;

Figure 1:
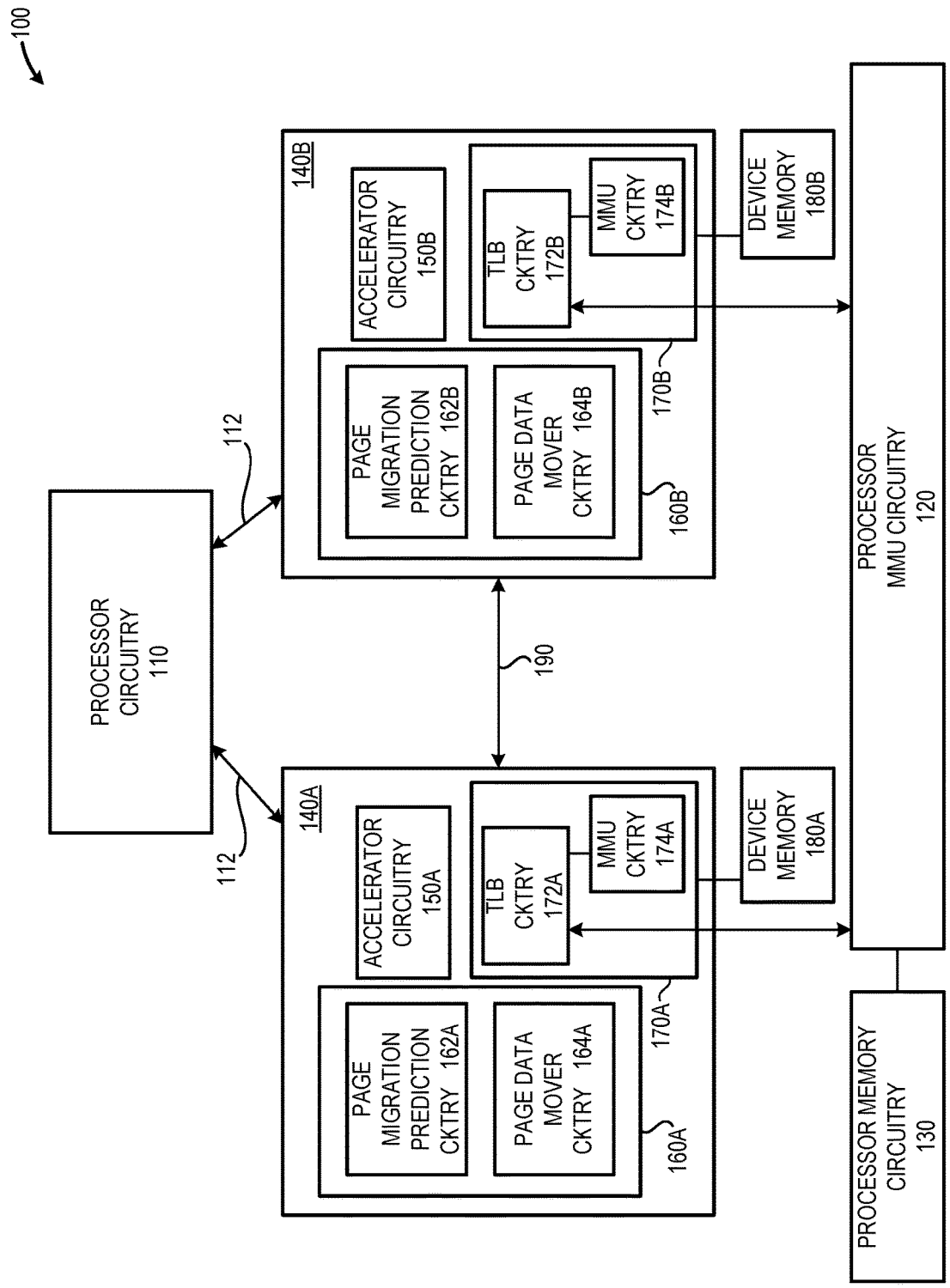
FIG. 1 is a block diagram of an illustrative system that includes processor circuitry, processor memory management unit (P-MMU) circuitry, processor memory circuitry, a plurality of acceleration units, each of the acceleration units having respective accelerator memory circuitry, and an inter-accelerator fabric circuit that communicatively couples the acceleration units, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

In systems having multiple accelerators, accelerator performance is typically scaled using either platform level scaling or in-package scaling. With platform level scaling multiple accelerators disposed in a single server node are communicatively coupled using an inter-accelerator fabric. Each of the accelerators presents itself as a separate device with local high bandwidth memory to the processor circuitry. Each of the accelerators is able to access a peer's memory via the inter-accelerator fabric. With platform level scaling, access to an accelerator's local memory provides the highest bandwidth and lowest latency than accesses to a peer accelerator's memory.

With in-package scaling, given the relatively higher cost and manufacturing complexity of large silicon dies, the trend is towards accelerators constructed using smaller chiplets communicatively coupled using a silicon interposer or silicon bridge, such as an embedded multi-die interconnect bridge (EMIB). For example, a chiplet may include processor circuitry and memory controller circuitry. Accesses to the chiplet local memory has the highest bandwidth and lowest latency than access to the memory of a peer chiplet.

To optimize performance of such heterogeneous platforms, programmers will perform non-uniform memory access optimizations at three levels: first, between the processor circuitry and the accelerator circuitry; second, between the accelerator circuitry and remote memory circuitry when the working set fails to fit in local memory circuitry; and third, between chiplets included in the accelerator circuitry.

In the systems and methods disclosed herein, the accelerator circuitry (GPGPU, FPGA, TPU, etc.) is communicatively coupled to the processor circuitry using either an input/output (I/O) link like PCIe or a coherent link like IAL, CCIX, NVLink, and similar. The accelerator circuitry includes local high-bandwidth memory, hereinafter referred to as "accelerator memory circuitry." If the accelerator circuitry is coherently attached, the accelerator memory circuitry is accessible by the processor circuitry and exposed to the device operating system as system memory circuitry. The accelerator circuitry is a shared virtual memory (SVM) capable device that can perform memory accesses using application virtual addresses. In the systems and methods disclosed herein, the accelerator circuitry implements an address translation cache using address translation services (ATS) defined by PCIe ATS. In the systems and methods disclosed herein, the accelerator circuitry also supports page-faults. Page fault handling is implementation specific, with some implementations blocking on fault and other implementations context switching the accelerator thread out.

The systems and methods disclosed herein provide benefits and advantages over conventional accelerator circuitry by permitting applications to transparently use accelerator memory circuitry. More specifically, the systems and methods disclosed herein propose several beneficial enhancements. First, the systems and methods disclosed herein permit oversubscription of the accelerator memory circuitry by permitting programmers to allocate more memory than physically available in the accelerator circuitry. The accelerator memory manager can spill over to processor connected memory circuitry (e.g., CPU DRAM). Second, the systems and methods disclosed herein beneficially permit auto-non-uniform memory access (NUMA) optimization such that the accelerator circuitry provides information to the driver that is used by the driver to implement heuristics for causing the migration of memory pages between the accelerator memory circuitry and the processor memory circuitry based on frequency of accesses. Advantageously, the intelligent migration of data to be physically close to the point of use improves application performance. Third, the systems and methods disclosed herein beneficially provide scalable address translation. The accelerator circuitry supports secure virtual machine (SVM), thus memory accesses generated by the accelerator circuitry require translation. A miss in the accelerator translation lookaside buffer circuitry (A-TLB) generates an address translation services (ATS) translation request over the PCIe link to the I/O memory management unit (IOMMU). As accelerator bandwidth to accelerator memory circuitry increases and accelerator memory circuitry capacity increases, unless the A-TLB maintains a relatively high hit rate, the A-TLB miss path will present a bottleneck. Fourth, the systems and methods disclosed herein beneficially permit accelerator memory circuitry virtualization to provide isolation and high-performance direct access to accelerator memory circuitry by virtual machines implemented in processor circuitry. Fifth, the systems and methods disclosed here permit peer mappings, providing the accelerator circuitry the capability to map peer accelerator memory circuitry in the A-TLB. Sixth, the systems and methods disclosed herein provide peer-to-peer migration capability such that the accelerator circuitry is able to migrate pages from the memory circuitry in another accelerator over the inter-accelerator fabric thereby facilitating high-speed page migration with minimal involvement of the processor circuitry.

The systems and methods disclosed herein beneficially permit the accelerator memory management unit circuitry (A-MMU) to perform address translation in conjunction with a system IOMMU to improve the likelihood of locally obtaining a successful translation, improving system performance. Further the accelerator circuitry provides usage statistics to the accelerator driver circuitry. The accelerator driver circuitry uses the usage statistics to determine which pages to migrate from processor memory circuitry to accelerator memory circuitry and which pages to evict from accelerator memory circuitry to processor memory circuitry to create space for incoming pages to the accelerator memory circuitry or to reduce access time to the evicted pages by the processor circuitry. The A-MMU supports efficient virtualization of accelerator memory circuitry without requiring significant virtual machine manager (VMM) overhead—nested first and second level translations, direct access to migration hints from a guest driver, and direct access to A-MMU invalidation queue from the guest driver. Additionally, the accelerator page table format includes data representative of metadata to configure data transformation operations (compression/decompression; encoding/decoding, etc.) in addition to configuring translation and access rights.

The systems and methods disclosed herein beneficially provide a plurality of peer-to-peer accelerator circuits, each having memory circuitry to store memory pages for use by the accelerator circuits. The accelerator circuitry additionally includes migration predictor circuitry and data mover circuitry to transfer data between processor memory circuitry and accelerator memory circuitry based on statistical usage information gathered by the migration predictor circuitry. The accelerator circuitry includes translation lookaside buffer circuitry (A-TLB) and memory management unit circuitry (A-MMU). In operation, the A-TLB circuitry performs a translation of one or more virtual memory addresses to one or more physical memory addresses in the accelerator memory circuitry. The migration prediction circuitry collects data associated with memory accesses to physical memory. Based, at least in part, on the collected statistical information, the migration predictor circuitry causes the migration circuitry to transfer data between the accelerator memory circuitry and the processor memory circuitry. Beneficially, pages may be transferred between the accelerator memory circuitry and the processor memory circuitry based on the circuitry (e.g., accelerator circuitry or processor circuitry) generating the memory accesses, thereby improving the performance of the system by reducing latency attributable to actual physical memory access.

An electronic device is provided. The electronic device may include: processor circuitry; processor memory management unit (MMU) circuitry; processor memory circuitry; at least one accelerator system, including: at least one accelerator circuit; accelerator memory circuitry communicatively coupled to the at least one accelerator circuit, the accelerator memory circuitry to locally store a plurality of pages transferred from processor memory circuitry; accelerator virtual-to-physical address translation circuitry to translate a virtual address received from the at least one accelerator circuit to a physical memory address in one of: the processor memory circuitry or the accelerator memory circuitry; and accelerator migration circuitry to: collect usage data for the virtual-to-physical address translations performed by the accelerator virtual-to-physical address translation circuitry; and cause the bidirectional transfer of data between the processor memory circuitry and the accelerator memory circuitry based, at least in part, on the collected usage data.

A processor acceleration method is provided. The method may include: performing, by accelerator virtual address-to-physical address translation circuitry disposed in an accelerator unit, translation of one or more virtual memory addresses to one or more physical memory addresses; collecting, by accelerator migration circuitry, data associated with a plurality of virtual memory address-to-physical memory address translations performed by the accelerator virtual address-to-physical address translation circuitry; and causing, by the accelerator migration circuitry, a migration of one or more pages from processor memory circuitry to the accelerator memory circuitry based, at least in part, on the collected virtual memory address-to-physical memory address translation data.

A processor acceleration system is provided. The system may include: means for performing translation of one or more virtual memory addresses to one or more physical memory addresses; means for collecting data associated with a plurality of virtual memory address-to-physical memory address translations performed by accelerator virtual address-to-physical address translation circuitry; and means for migrating one or more pages between processor memory circuitry and accelerator memory circuitry based, at least in part, on the collected virtual memory address-to-physical memory address translation data.

A non-transitory storage device is provided. The non-transitory storage device may include includes instructions that, when executed by accelerator circuitry, causes the accelerator circuitry to: cause accelerator virtual address-to-physical address translation circuitry disposed in an accelerator unit to translate of one or more virtual memory addresses to one or more physical memory addresses; cause accelerator migration circuitry to collect data associated with a plurality of virtual memory address-to-physical memory address translations performed by the accelerator virtual address-to-physical address translation circuitry; and cause the accelerator migration circuitry, to migrate one or more pages from processor memory circuitry to accelerator memory circuitry based, at least in part, on the collected virtual memory address-to-physical memory address translation data.

An accelerator system is provided. The system may include: at least one accelerator circuit; accelerator memory circuitry communicatively coupled to the at least one accelerator circuit, the accelerator memory circuitry to locally store a plurality of pages transferred from processor memory circuitry; accelerator virtual-to-physical address translation circuitry to translate a virtual address received from the at least one accelerator circuit to a physical memory address in one of: the processor memory circuitry or the accelerator memory circuitry; accelerator migration circuitry to: collect usage data for the memory accesses to physical memory; and cause the bidirectional transfer of data between the processor memory circuitry and the accelerator memory circuitry based, at least in part, on the collected usage data.

FIG. 1 is a block diagram of an illustrative system 100 that includes processor circuitry 110, processor memory management unit (P-MMU) circuitry 120, processor memory circuitry 130, a plurality of acceleration units 140A/140B (collectively, "acceleration units 140"), each of the acceleration units having respective accelerator memory circuitry 180A/180B, and an inter-accelerator fabric circuit 190 that communicatively couples the acceleration units 140A/140B, in accordance with at least one embodiment described herein. Each of the acceleration units 140A, 140B includes respective acceleration circuitry 150A, 150B, migration circuitry 160A, 160B, and virtual-to-physical address translation circuitry 170A, 170B. In embodiments, the migration circuitry 160 may include migration prediction circuitry 162 to collect page usage information and/or data (virtual-to-physical address translation hit/miss counts, etc.) and page data mover circuitry 164 to transfer page data between the accelerator memory circuitry 180 and the processor memory circuitry 130. In embodiments, the virtual-to-physical address translation circuitry 170 may include multiple circuits, such as translation lookaside buffer (A-TLB) circuitry 172 to store data representative of virtual-to-physical address translations within the communicably coupled accelerator memory circuitry 180 and memory management unit (A-MMU) circuitry 174 to manage the storage, eviction, and retrieval of information and/or data to/from the accelerator memory circuitry 180.

In operation, as the accelerator circuitry 150 performs operations, such as vector/tensor mathematical operations, based on memory usage the migration circuitry 160 may cause the migration of pages from system memory circuitry and/or processor memory circuitry 130 into accelerator memory circuitry 180. Maintaining data frequently used/accessed in accelerator memory circuitry 180 improves system performance by reducing access time/latency of the accelerator unit 140. In embodiments, the migration circuitry 160 collects, gathers, receives, or otherwise obtains statistical information associated with some or all or a plurality of pages maintained in the accelerator memory circuitry 180. As pages are accessed with increasing frequency, the migration circuitry 160 may cause a transfer of the page from processor memory circuitry 130 and/or system memory circuitry to the accelerator memory circuitry 180. Conversely, as pages are accessed with decreasing frequency, the migration circuitry 160 may cause an eviction of such less frequently accessed pages from accelerator memory circuitry 180 to processor memory circuitry 130 or to system memory circuitry.

In operation, as memory operations are performed, the A-TLB circuitry 172 may provide virtual-to physical address translations not only for physical addresses within the accelerator memory circuitry 180A coupled to the respective accelerator circuitry 150A, but also in some or all of the other accelerator memory circuitry 180B-180$n$ coupled to each of the remaining accelerator circuitry 150B-150$n$. Such accesses benefit from the relatively high-bandwidth, inter-accelerator fabric connection 190 that communicatively couples the accelerator units 140A-140$n$. In addition, the A-TLB circuitry 172 works cooperatively with the P-MMU circuitry 120, permitting the accelerator circuitry 150 access to pages stored, contained, or otherwise retained in the processor memory circuitry (e.g., processor DRAM) 130. Thus, memory operations requested by the accelerator circuitry 150 will typically access physical memory addresses coupled to the accelerator circuitry 150 using the relatively high-bandwidth inter-accelerator fabric connection 190 or the high-bandwidth connection to processor memory 130. In addition, the A-MMU circuitry 174 supports virtualization of the accelerator memory circuitry 180. In embodiments, the A-MMU circuitry 174 performs nested first and second level translations, provides direct access to page migration hints from guest driver(s), and/or provides direct access to the A-MMU invalidation queue from the guest driver(s). Beneficially, the accelerator page table format may include information/data representative of virtual-to-physical address translation, access rights, in addition to metadata designating various data transformation operations on the data maintained within the accelerator memory circuitry 180.

The system 100 may be implemented using any form of system architecture, such as system-on-chip (SoC) architecture or using a plurality of communicatively coupled chiplets in a multi-chip module (MCM) architecture. The processor circuitry 110 may include any number and/or combination of currently available and/or future developed electrical components, semiconductor devices, and/or logic elements that are configured or communicatively coupled to execute one or more machine-readable instruction sets. The processor circuitry 110 may include any number or combination of single- or multi-thread core circuits. In embodiments, the processor circuitry 110 may execute instructions and/or instruction sets that configure one or more VMMs, each of the one or more VMMs supervising the operation of one or more virtual machines. The processor circuitry 110 may include any number and/or combination of processors, microprocessors, controllers, microcontrollers, signal processors, or similar. The processor circuitry 110 is communicatively coupled to P-MMU circuitry 120 and processor memory circuitry 130. Although not shown in FIG. 1, the processor circuitry 110 may be coupled to processor translation lookaside buffer (P-TLB) circuitry.

The P-MMU circuitry 120 includes any number and/or combination of currently available and/or future developed electrical components, semiconductor components, and/or logic elements capable of storing information and/or data representative of virtual-to-physical address translations in processor memory circuitry 130. In embodiments, the information and/or data representative of virtual-to-physical address translations in processor memory circuitry 130 may be stored, contained, or otherwise retained in the P-MMU circuitry 120 in the form of page tables. In embodiments, the information and/or data stored, retained, and/or contained in the P-MMU circuitry 120 may include virtual-to-physical system memory circuitry address translations. In embodiments, the P-MMU circuitry 120 may be disposed in, on, or about one or more chiplets or similar semiconductor dies. In embodiments, the P-MMU circuitry 120 may be disposed on a common semiconductor die with some or all of the processor circuitry 110.

The processor memory circuitry 130 may include any number and/or combination of currently available and/or future developed electrical components, semiconductor devices, and/or logic elements capable of the non-persistent storage of information and/or data. In embodiments the processor memory circuitry 130, may include any number and/or combination of static random access memory (SRAM) and/or dynamic random access memory (DRAM). In embodiments, the processor memory circuitry 130 may be disposed in, on, or about one or more chiplets or similar semiconductor dies. In embodiments, the processor memory circuitry 130 may be disposed on a common semiconductor die with some or all of the processor circuitry 110.

Each of the plurality of accelerator units 140A-140n includes accelerator circuitry 150A-150n (collectively, "accelerator circuitry 150"), migration circuitry 160A-160n (collectively, "migration circuitry 160"), and virtual-to-physical address translation circuitry 170A-170n (collectively, "virtual-to-physical address translation circuitry 170"). The accelerator circuitry 150 may include may include any number and/or combination of currently available and/or future developed electronic components, semiconductor devices, and/or logic elements configured to provide a Tensor Processing Unit (TPU) or similar device or system capable of performing mathematical operations, such as mathematical operations using arrays, matrices, or tensors.

The migration circuitry 160 includes any number and/or combination of electrical devices, semiconductor components, and/or logic elements capable of providing migration prediction circuitry 162 and page data mover circuitry 164. In embodiments, the migration prediction circuitry 162 receives, collects, polls, or otherwise acquires statistical information representative of memory transactions that occur involving the accelerator memory circuitry 180. In embodiments, the migration prediction circuitry 162 compares the statistical information with one or more defined threshold values. In embodiments, the one or more defined threshold values may include any number or combination of fixed threshold values and/or or dynamically determined threshold values generated by the migration prediction circuitry 162. Using the received statistical information, the migration prediction circuitry 162 may cause the page data mover circuitry 164 to transfer data from either the processor memory circuitry 130 or system main memory circuitry to the accelerator memory circuitry 180. Using the received statistical information, the migration prediction circuitry 162 may cause the page data mover circuitry 164 to evict data from the accelerator memory circuitry 180 to the processor memory circuitry 130 or system main memory circuitry. Thus, the migration prediction circuitry 162 beneficially maintains fresh data in the accelerator memory circuitry 180 (e.g., data most frequently accessed by the accelerator circuitry 150). By maintaining data that is most frequently accessed by the accelerator circuitry 150 in accelerator memory circuitry 180 coupled via high-bandwidth connection to the accelerator circuitry 150, latency is reduced and system performance beneficially improved. In embodiments, the migration prediction circuitry 162 may include an artificial intelligence (AI) inference engine to learn, detect, and/or predict common memory access patterns and therefore proactively trigger data migrations and/or evictions from the accelerator memory circuitry 180. In other embodiments, the migration prediction circuitry 162 may receive one or more signals originated by one or more application drivers. Such signals may be based on application driver policies that trigger the data migration and/or eviction from the accelerator memory circuitry 180. In yet other embodiments, the migration prediction circuitry 162 may receive one or more signals originated by one or more applications executed by the processor circuitry 110.

The migration prediction circuitry 162 includes performance counter circuitry and/or hardware monitoring circuitry that, when combined with prediction instruction sets executed by the migration prediction circuitry 162, provide hints to identify candidate pages for migration from processor memory circuitry 130 to accelerator memory circuitry 180 or candidate pages for eviction from the accelerator memory circuitry 180 to the processor memory circuitry 130. In embodiments, the migration prediction circuitry 162 may be implemented as an extension to the A-TLB circuitry 172 where the migration prediction circuitry 162 provides a history buffer of frequently referenced virtual-to-physical address translations obtained from the P-MMU circuitry 120 to pages in processor memory circuitry 130 or virtual-to-physical address translations obtained from the A-MMU circuitry 174 to pages in local accelerator memory circuitry 180A or peer accelerator memory circuitry 180B-180n. Migrations between processor memory circuitry 130 and accelerator memory circuitry 180 may be initiated by the accelerator unit 140 driver on hints from the migration prediction circuitry 162 on explicit pre-fetch hints by the applications, or on-demand for servicing a CPU or XPU page fault.

The page data mover circuitry 164 includes direct memory access (DMA) circuitry to migrate pages between local accelerator memory circuitry 180 to processor memory circuitry 130. In configurations that include a plurality of accelerator units 180A-180n, the page data mover circuitry 164 may also migrate pages between local accelerator memory circuitry 180A and peer accelerator memory circuitry 180B-180n. The page data mover circuitry 164 may perform accelerator unit specific data transformations such as format conversions, compression, packing/unpacking RGB surfaces, and similar. The accelerator page table (A-PT) may include information and/or data, such as metadata, to identify such transformed pages. Transformed pages may only be accessed by accelerator unit devices, in such embodiments, the pages may not be accessed by the processor circuitry 110.

The virtual-to-physical address translation circuitry 170 includes the A-TLB circuitry 172 and the A-MMU circuitry 174. In operation, the accelerator circuitry 150 executes memory operations on data stored at virtual memory addresses. In order to access the data at a physical memory address, the virtual address generated by the accelerator circuitry 150 is translated. Initially, the accelerator unit 140 determines whether the virtual-to-physical address translation is stored or otherwise retained within the A-TLB circuitry 172. If the virtual address is not stored or otherwise retained in the A-TLB circuitry 172, the accelerator unit 140 determines whether the virtual-to-physical address translation is stored or otherwise retained within the A-MMU circuitry 174. If the virtual-to-physical address translation is not found within the A-MMU circuitry 174, the A-TLB circuitry 172 causes a lookup of the virtual address in the P-MMU circuitry 120.

The A-TLB circuitry 172 includes any number and/or combination of currently available or future developed electronic components, semiconductor devices, and/or logic elements capable of providing virtual-to-physical address translations. If the virtual address is not available within the A-TLB circuitry 172, rather than perform or service the translation request using the P-MMU circuitry 120, the translation is advantageously first serviced using the A-MMU circuitry 174. Unavailability of the virtual-to-physical address translation in the accelerator page table (A-PT) may imply the page is not stored, contained, or otherwise retained in the accelerator memory circuitry 180. In such instances, the miss in the A-TLB may be communicated to the P-MMU circuitry 120 and the virtual-to-physical address translation performed by the P-MMU's page table. The A-TLB circuitry 172 distinguishes and caches virtual-to-physical address translations obtained from either A-MMU circuitry 174 or P-MMU circuitry 120. The A-TLB circuitry 172 supports the same invalidation capability as a conventional A-TLB and services accelerator unit 140 driver generated invalidations on A-PT changes. The A-TLB circuitry 172 additionally supports a page request interface to report page faults encountered on translations obtained from the P-MMU page tables. Additionally, the A-TLB circuitry 172 may provide the ability to report A-MMU local page faults to the accelerator unit 140 driver for specific page-fault conditions encountered on virtual-to-physical memory address translations obtained from the A-PT.

The A-MMU circuitry 174 includes any number and/or combination of currently available or future developed electronic components, semiconductor devices, and/or logic elements capable of using accelerator page tables (A-PT) to provide virtual-to-physical address translations for pages that are resident in either local accelerator memory circuitry 180A, peer accelerator memory circuitry 180B-180n, and/or processor memory circuitry 130. If the page is not stored or otherwise retained in either the host or peer accelerator memory circuitry 180, the A-PT specifies whether to perform another virtual-to-physical address lookup using the P-MMU circuitry 120 or generate an A-MMU page fault to the driver of the accelerator unit 140. The A-MMU page fault may cause the page data mover circuitry 164 to initiate migration of the page from either processor memory circuitry 130 or peer accelerator memory circuitry 180B-180n to the local accelerator memory circuitry 180A. The A-PT is stored, contained, or otherwise retained within the accelerator memory circuitry 180 thereby enabling the A-MMU circuitry 174 to page walk bandwidth to scale with accelerator memory circuitry 180 bandwidth.

The accelerator memory circuitry 180 includes any number and/or combination of currently available and/or future developed electrical components, semiconductor devices, and/or logic elements capable of retaining, storing, or otherwise providing non-persistent data storage. The accelerator memory circuitry 180A included in each of the accelerator units 140A may be accessed by one or more of the remaining accelerator units 140B-140n via the inter-accelerator fabric 190. Thus, the A-TLB circuitry 172A-172n in any of the accelerator units 140A-140n may be used to access a physical memory address located in any of the other accelerator memory circuits 180A-180n. In embodiments, the processor circuitry 110 may access information and/or data stored in any of the accelerator memory circuitry 180A-180n. Thus, data accessed by the processor circuitry 110 may be stored, contained, or otherwise retained in any combination of processor memory circuitry 130 and at least a portion of any number of accelerator memory circuitry 180A-180n.

Figure 2:
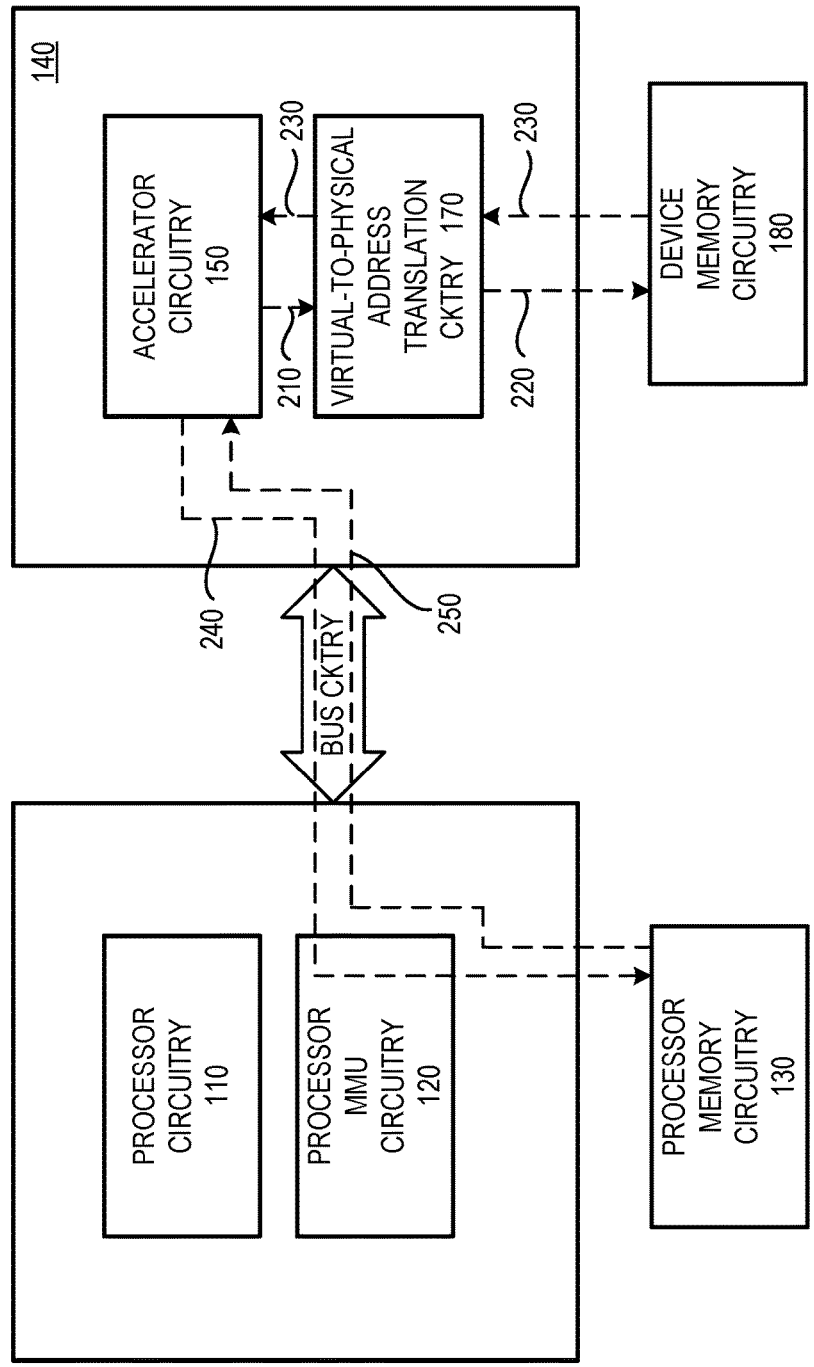
FIG. 2 is a block diagram of an illustrative system for performing a memory access operation by an accelerator unit, in accordance with at least one embodiment described herein.

FIG. 2 is a block diagram of an illustrative system 200 for performing a memory access operation by an accelerator unit 140, in accordance with at least one embodiment described herein. In embodiments, an instruction executed by the accelerator circuitry 150 generates a memory access operation at a virtual memory address. In embodiments, the accelerator circuitry 150 communicates a request 210 containing the virtual address to the virtual-to-physical address translation circuitry 170. Responsive to obtaining a valid translation from the virtual-to-physical address translation circuitry 170, the data is accessed 220 and retrieved 230 from the accelerator memory circuitry 180.

If the virtual-to-physical address translation in the virtual-to-physical address translation circuitry 170 is programmed to force migration, an accelerator page request is reported to the host driver. The host driver services the accelerator page request by initiating a page migration from the processor memory circuitry 130 to the accelerator memory circuitry 180, updating the virtual address translation in the virtual-to-physical address translation circuitry 170 with requested permissions to the new physical address in accelerator memory circuitry 180 and returns an accelerator page table response back to the accelerator circuitry 150. In response to the receipt of the accelerator page table response, the accelerator unit 140 may resume or re-schedule the faulted access. As part of the page migration process, the accelerator memory directory state of the page in the accelerator memory circuitry 180.

In embodiments, if the accelerator unit 140 defers 240 the virtual-to-physical address translation to the P-MMU circuitry 120 by invoking an ATS translation require for the virtual address. The P-MMU circuitry 120 returns the translation for the virtual address from the host system page table in the ATS translation response. If the translation response includes a valid virtual-to-physical address mapping, the accelerator unit 140 access is issued to the physical address in processor memory 130 returned by the ATS translation response. In embodiments, the A-MMU circuitry 174 reports a fault to the device driver. The driver will check the fault to see if the fault can be handled by the device driver, for example if faulting virtual address is mapped to a peer accelerator device than driver can insert a mapping into the A-MMU circuitry 174 and thus clear the fault. In embodiments where the device driver is unable to remedy the fault, the device driver may escalate the fault to the operating system or virtual machine manager (OS/VMM).

The OS/VMM page fault handler services the page-fault by ensuring the page is resident in the processor memory circuitry 130, updating the virtual address mapping in the system page table with the requested permissions to refer to the physical address in the processor memory circuitry 130 and returns a page request response back (via the P-MMU circuitry 120) to the accelerator unit 140. On system page table page request response, the accelerator unit 140 can resume or re-schedule the faulted address.

Figure 3:
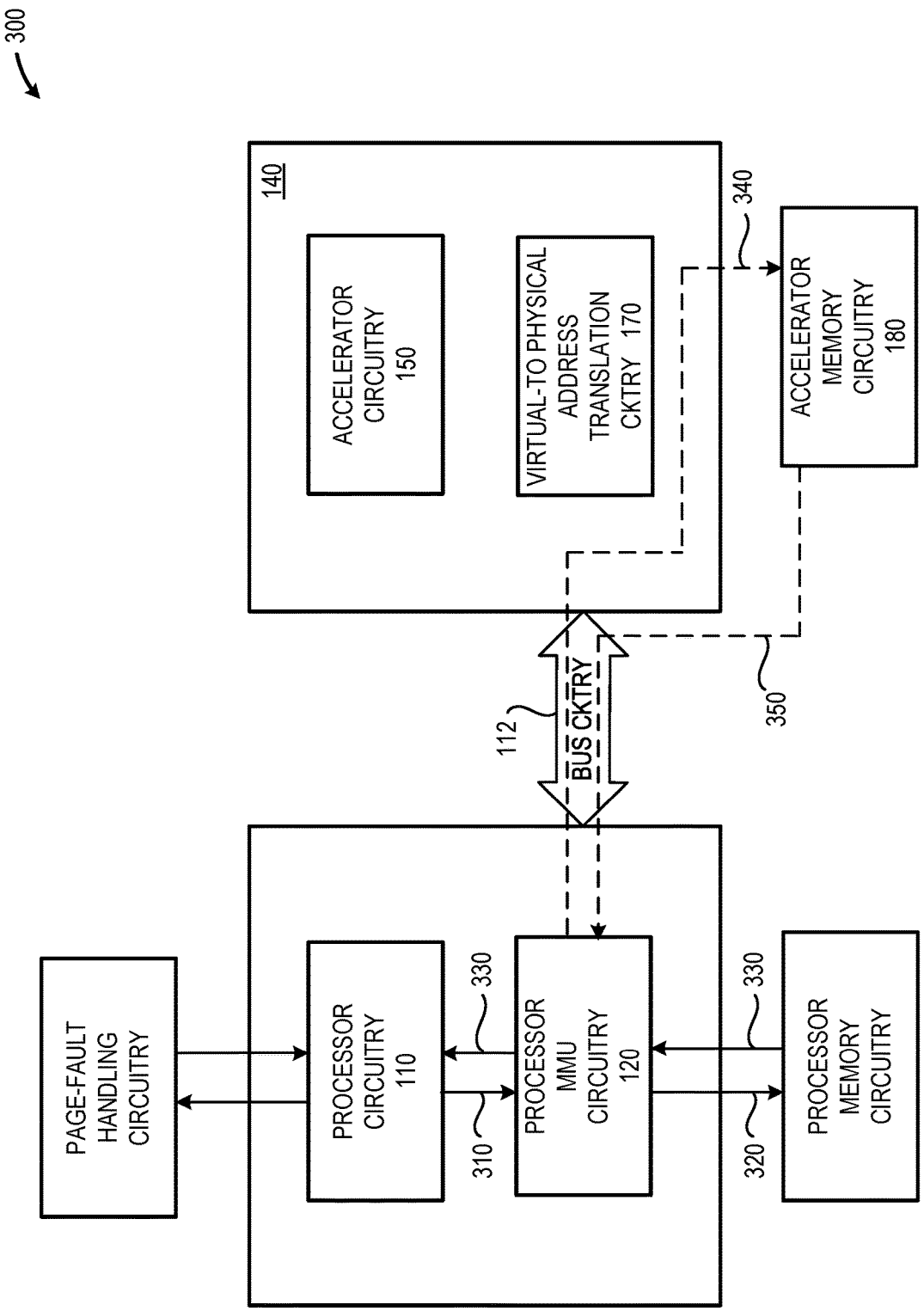
FIG. 3 is a block diagram of an illustrative system for performing a page access operation by processor circuitry when the page is resident in processor memory circuitry as compared to when the page is migrated to accelerator memory circuitry, in accordance with at least one embodiment described herein.

FIG. 3 is a block diagram of an illustrative system 300 for performing a page access operation by processor circuitry 110 when the page is resident in processor memory circuitry as compared to when the page is migrated to accelerator memory circuitry 180, in accordance with at least one embodiment described herein. In embodiments, an instruction executed by the processor circuitry 110 generates a memory access operation at a virtual memory address. In embodiments, the processor circuitry 110 communicates a request 310 containing the virtual address to the P-MMU circuitry 120. Responsive to obtaining a valid translation from the P-MMU circuitry 120, the data is accessed 320 and retrieved 330 from the processor memory circuitry 130.

A CPU page fault is generated responsive to a failure to detect the virtual address in the P-MMU circuitry 120. Responsive to a page fault caused by an operating system memory management activity (such as a copy-on-write fault, or due to page swap activity to storage), the O/S memory manager services the page fault by making the page resident in processor memory circuitry 130, updating the virtual address mapping in the P-MMU circuitry 120 with required permissions and resuming execution of the instruction causing the page fault.

If the page fault occurs while the processor circuitry 110 attempts to access a page previously marked as read-only (or not present) in the P-MMU circuitry 120 due to the page being resident in accelerator memory circuitry 180, the page-fault processing by the O/S involves the processor circuitry notifier, for example, the O/S may invoke an OS MMU notifier that will call into the registered driver that owns the backing page. The processor circuitry notifier invalidates the page in accelerator memory circuitry 180 (by migrating the page back to the processor memory circuitry 130 and transitioning the corresponding virtual-to-physical address translation circuitry 170 entry to "NOT PRESENT," after which normal fault processing may be completed by the O/S memory manager and the instruction incurring the page-fault resumed.

Figure 4:
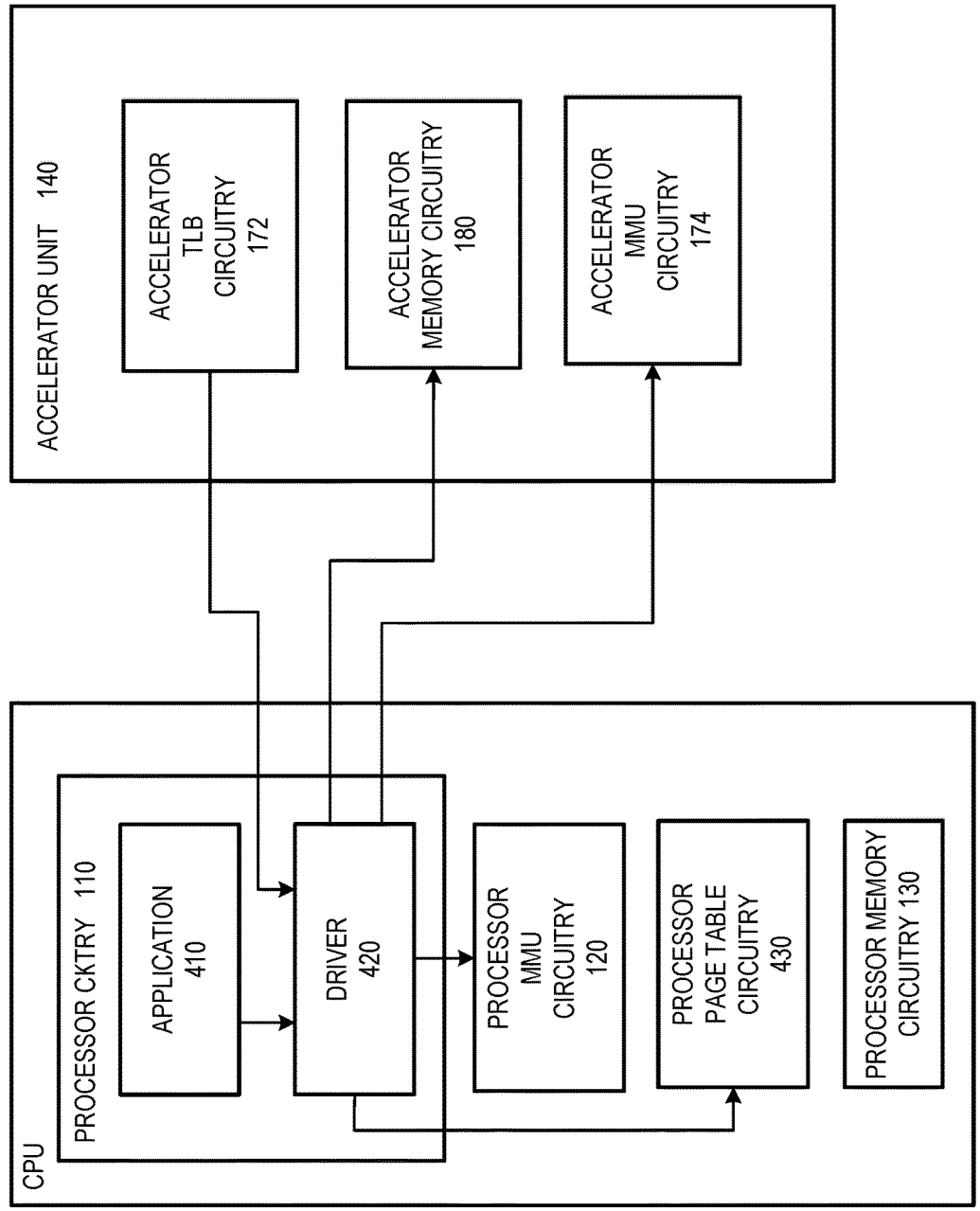
FIG. 4 is a block diagram of an illustrative system in which a page is migrated from processor memory circuitry to accelerator memory circuitry, in accordance with at least one embodiment described herein.

FIG. 4 is a block diagram of an illustrative system 400 in which a page is migrated from processor memory circuitry 130 to accelerator memory circuitry 180, in accordance with at least one embodiment described herein. As depicted in FIG. 4, an accelerator unit 140 driver may cause a page migration to the accelerator memory circuitry 180. In embodiments, the accelerator unit driver initiates a migration event based on an occurrence of a memory access operation at a virtual memory address. In embodiments, the accelerator unit driver 420 allocates space within the accelerator memory circuitry 180 for one or more pages.

The accelerator unit driver 420 communicates a request to the O/S to update the processor page table circuitry 430. In response, the O/S may synchronize the P-MMU circuitry 120 and the A-TLB circuitry 172 with a TLB shootdown flow. In embodiments, the TLB shootdown flow may request the O/S memory manager to mark the virtual address as READ-ONLY in the processor page table circuitry 430 in response to the page migrated to the accelerator memory circuitry 180 in a READ-ONLY state. In embodiments, the TLB shootdown flow may request the O/S memory manager to mark the virtual address as "NOT PRESENT" in the processor page table circuitry 430 in response to the page migrated to the accelerator memory circuitry 180 in a READ/WRITE state.

The accelerator unit driver 420 then updates the virtual address mapping in the accelerator page table circuitry to the page in the accelerator memory circuitry 180. In response to a page migrated to the accelerator memory circuitry 180 in a READ-ONLY state, the accelerator unit driver 420 causes both the processor page table circuitry 430 and the accelerator page table to have READ-ONLY mappings for the virtual address. In such embodiments, the processor page table circuitry 430 includes a READ-ONLY mapping of the virtual address to the page in processor memory circuitry 130 and the accelerator page table includes a READ-ONLY mapping of the page in the accelerator memory circuitry 180. Additionally, the accelerator unit driver 420 registers an A-MMU synchronization handler for the virtual address to synchronize accelerator memory circuitry 180 with future updates to the processor page table circuitry 430. In embodiments, the O/S memory manager invokes the A-MMU synchronization handler for future updates to map the processor page table circuitry 430 for the virtual address. In embodiments, the A-MMU synchronization handler causes the invalidation of the page in the accelerator memory circuitry 180.

Figure 5:
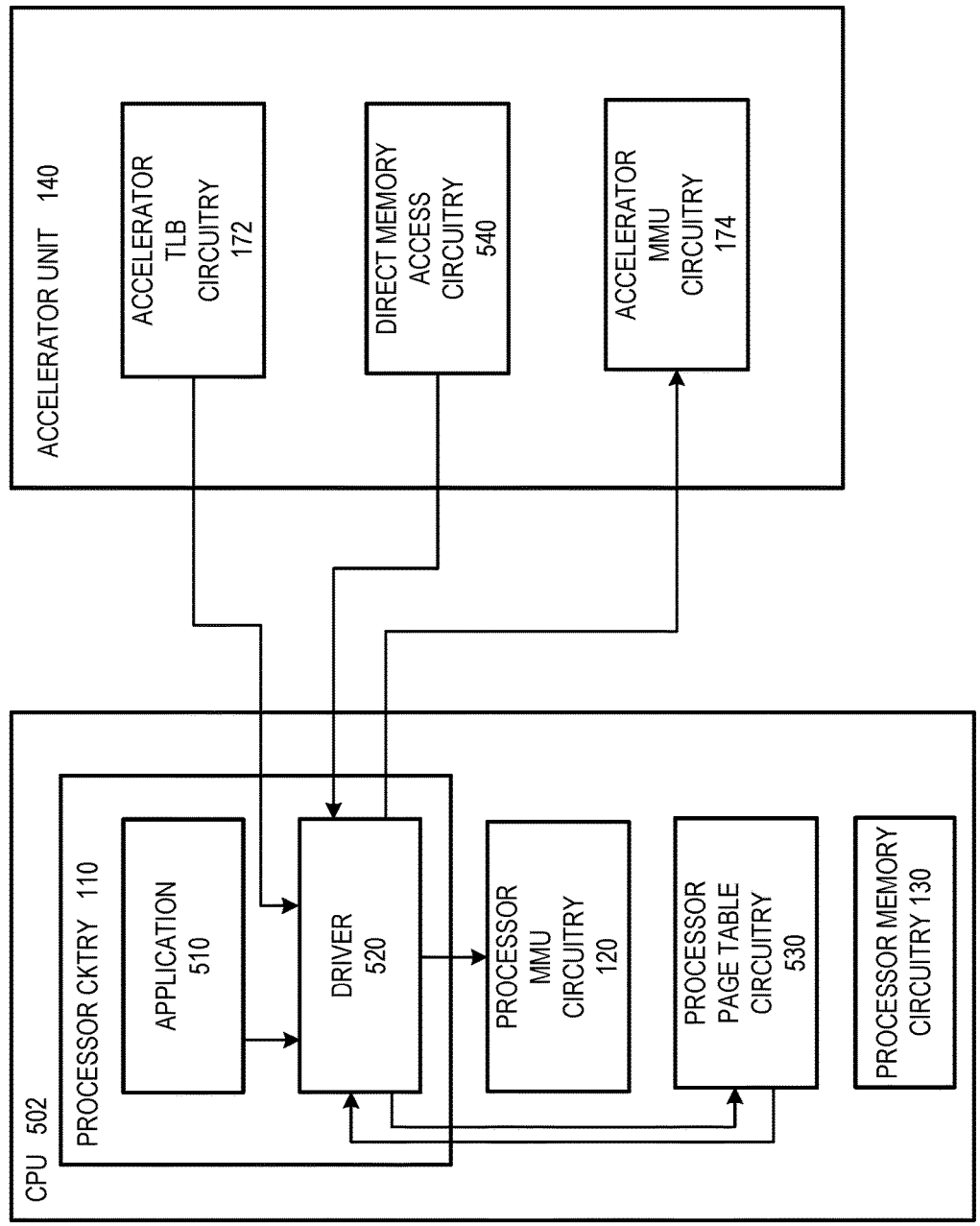
FIG. 5 is a block diagram of an illustrative system in which a page is migrated from accelerator memory circuitry to processor memory circuitry, in accordance with at least one embodiment described herein.

In response to a page migrated to the accelerator memory circuitry 180 in a READ/WRITE state, for an I/O attached accelerator unit 140 the accelerator unit driver 420 registers the virtual address backing page with the O/S as associated with the A-MMU circuitry 174. Registering the virtual address enables the O/S memory manager to invoke the A-MMU circuitry 174 on future references to the virtual address, thereby permitting a reverse migration of the page from accelerator memory circuitry 180 to processor memory circuitry 130. For a coherently attached accelerator unit 140, the accelerator unit driver 420 may request the O/S memory manager to update the virtual address mapping in the processor page table circuitry 430 to the physical address of the migrated page in accelerator memory circuitry 180. Both the processor page table circuitry 430 and the accelerator page table include READ/WRITE mappings to the page in the accelerator memory circuitry 180, thereby enabling coherent access across the CPU and the accelerator unit 140. In embodiments, since the processor page table circuitry 430 and the accelerator page table may have mappings for the virtual address, the accelerator unit driver 420 registers a A-MMU synchronization handler for the virtual address such that any future modification to the virtual address mapping in the processor page table circuitry 430 by the O/S memory manager may be synchronized with the accelerator page table. In embodiments, the accelerator unit driver 420 may force the reverse migration of the page from the accelerator memory circuitry 180 to the device memory circuitry 130 as needed. In embodiments, if the page migration trigger invoking the FIG. 5 is a block diagram of an illustrative system 500 in which a page is migrated from accelerator memory circuitry 180 to processor memory circuitry 130, in accordance with at least one embodiment described herein. As depicted in FIG. 5, an accelerator unit 140 driver may cause a page migration to the processor memory circuitry 130. In such instances, an application 510 executed by the processor circuitry 110 may cause the accelerator unit driver 520 to initiate a migration event based on an occurrence of a memory access operation at a virtual memory address. In embodiments where the accessed page is in a READ ONLY state, the accelerator unit driver 520 may un-map the virtual address in the A-PT thereby causing the delegation of accelerator unit 140 accesses to the virtual address to the P-MMU circuitry 120 for translation towards a page stored or otherwise retained in the processor memory circuitry 130. In embodiments where the accessed page is in a READ/WRITE STATE, the accelerator unit driver 520 un-maps the virtual address in the accelerator page table.

The accelerator unit driver 520 then removes links to the page in the accelerator memory circuitry 180. For example, for a coherently attached accelerator unit 140 the accelerator unit driver 520 may remove a linkage between the A-MMU synchronization handler and the processor page table mapping of the page.

The accelerator unit driver 520 then invokes the accelerator DMA circuitry 540 within the page data mover circuitry 164 to copy the page from accelerator system memory 180 to the processor system memory 130.

The accelerator unit driver 520 then requests the O/S to update the virtual address mapping in the processor page table with the same permission associated with the page and virtual address in the A-PT.

Figure 6:
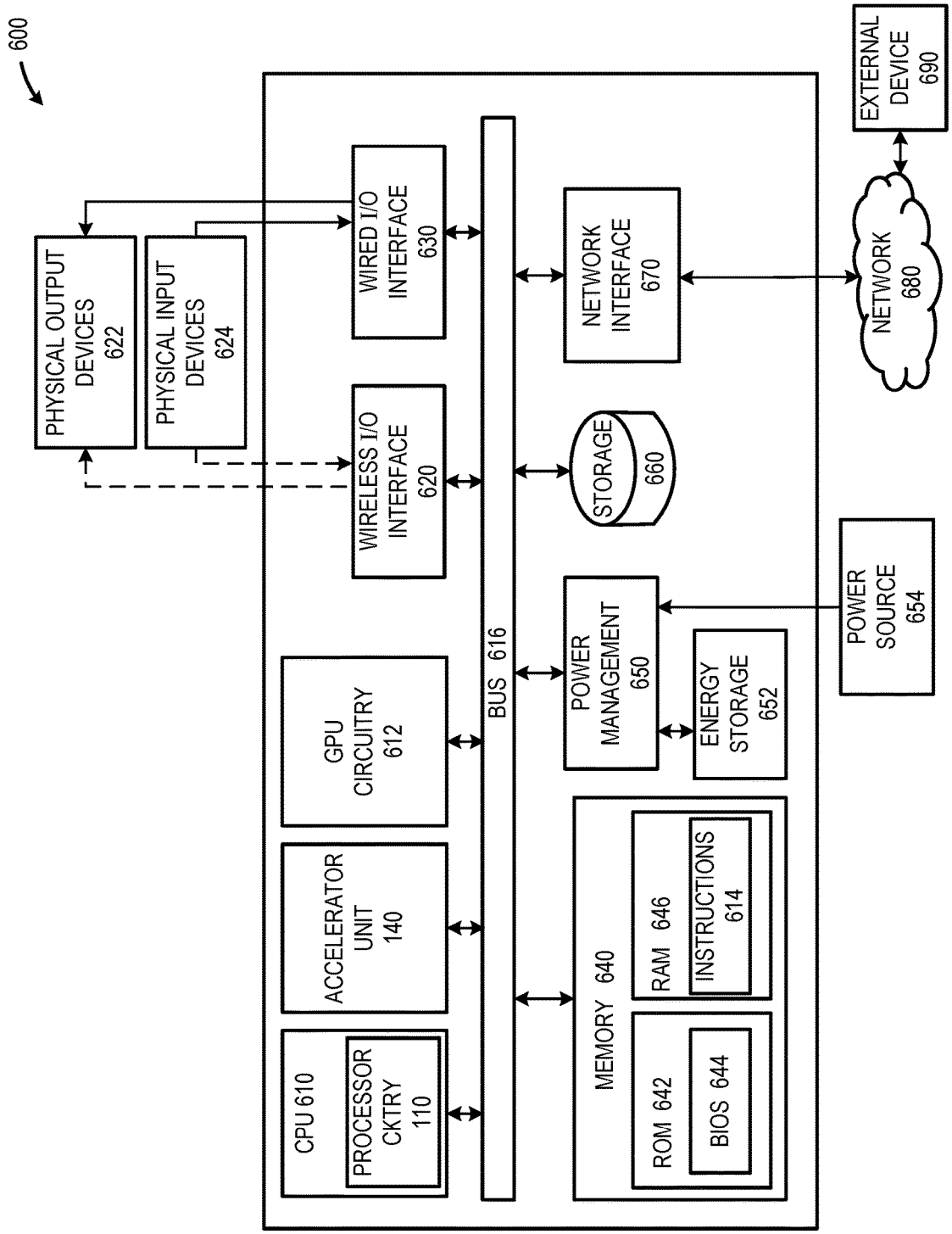
FIG. 6 is a schematic diagram of an illustrative electronic, processor-based, device that includes a central processing unit (CPU) or multi-chip module (MCM) that includes processor circuitry and one or more accelerator units, in accordance with at least one embodiment described herein.

FIG. 6 is a schematic diagram of an illustrative electronic, processor-based, device 600 that includes a central processing unit (CPU) or multi-chip module (MCM) 610 that includes processor circuitry 110 and one or more accelerator units 140, in accordance with at least one embodiment described herein. The processor-based device 600 may additionally include graphical processing unit (GPU) circuitry 612. The processor-based device 600 may additionally include one or more of the following: a wireless input/output (I/O) interface 620, a wired I/O interface 630, system memory 640, power management circuitry 650, a non-transitory storage device 660, and a network interface 670 used to communicatively couple the processor-based device 600 to one or more external devices (e.g., a cloud-based server) 690 via one or more networks 680. The following discussion provides a brief, general description of the components forming the illustrative processor-based device 600. Example, non-limiting processor-based devices 600 may include, but are not limited to: autonomous motor vehicles, semi-autonomous motor vehicles, manually controlled motor vehicles, smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 600 includes a bus or similar communications link 616 that communicably couples and facilitates the exchange of information and/or data between various system components including the CPU 610/processor circuitry 110, the graphics processor circuitry 612, one or more wireless I/O interfaces 620, one or more wired I/O interfaces 630, the system memory 640, one or more storage devices 660, and/or the network interface circuitry 670. The processor-based device 600 may be referred to in the singular herein, but this is not intended to limit the embodiments to a single processor-based device 600, since in certain embodiments, there may be more than one processor-based device 600 that incorporates, includes, or contains any number of communicably coupled, collocated, or remote networked circuits or devices.

The processor circuitry 110 may include any number, type, or combination of currently available or future developed devices capable of executing machine-readable instruction sets. The processor circuitry 110 may include but is not limited to any current or future developed single- or multi-core processor or microprocessor, such as: one or more systems on a chip (SOCs); Multi-chip Modules (MCMs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the processor-based device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the processor-based device 600, for example by causing the processor circuitry 110 to load and/or execute one or more machine-readable instruction sets 614. In embodiments, at least some of the one or more machine-readable instruction sets 614 cause at least a portion of the processor circuitry 110 to provide, create, produce, transition, and/or function as a dedicated, specific, and particular machine.

The processor-based device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The processor-based device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include but are not limited to: universal serial bus (USB), IEEE 1394 ("FireWire"), and similar.

The processor-based device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the processor-based device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor circuitry 110 and/or graphics processor circuitry 612 and/or one or more applications executed on or by the processor circuitry 110 and/or graphics processor circuitry 612. In some instances, one or more data storage devices 660 may be communicably coupled to the processor circuitry 110, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or WiFi®, etc.).

Machine-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor circuitry 110 and/or graphics processor circuitry 612.

The processor-based device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the processor-based device 600. The power source 654 may include, but is not limited to, a solar power system, a commercial electric grid, a portable generator, an external energy storage device, or any combination thereof.

For convenience, the CPU 610/processor circuitry 110, the GPU circuitry 612, the wireless I/O interface 620, the wired I/O interface 630, the system memory 640, the power management circuitry 650, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor circuitry 110 and/or the graphics processor circuitry 612. In some embodiments, all or a portion of the bus 616 may be omitted and the components are coupled directly to each other using suitable wired or wireless connections.

Figure 7:
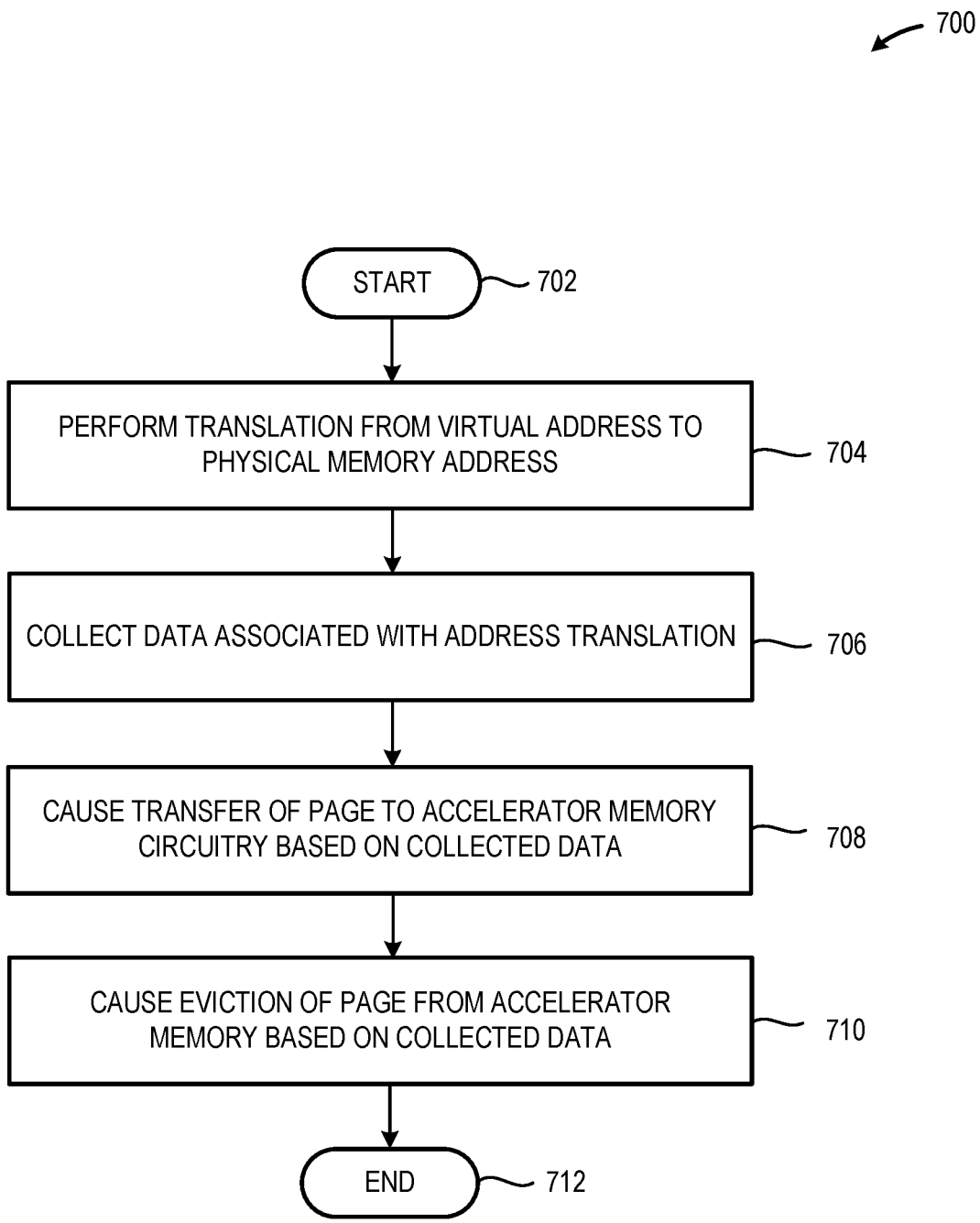
FIG. 7 is a high-level flow diagram of an illustrative method of causing the transfer of pages between accelerator memory circuitry and processor memory circuitry in a system that includes a plurality of peer-to-peer accelerator units coupled to processor circuitry, in accordance with at least one embodiment described herein.

FIG. 7 is a high-level flow diagram of an illustrative method 700 of causing the transfer of pages between accelerator memory circuitry 180 and processor memory circuitry 130 in a system that includes a plurality of peer-to-peer accelerator units coupled to processor circuitry 110. The method 700 beneficially improves memory access efficiency and minimizes system latency. The method 700 commences at 702.

At 704, in response to receipt of a memory access at a virtual address, the accelerator virtual-to-physical address translation circuitry 170 determines a physical memory address corresponding o the virtual address. In embodiments, the physical memory address may be located in local accelerator memory circuitry 180A. In other embodiments, the physical memory address may be located in peer accelerator unit memory circuitry 180B-180*n*. In yet other embodiments, the physical memory address may be located in processor physical memory circuitry 130.

At 706, the page migration circuitry 160 collects information and/or data associated with accelerator memory accesses Such information may be used to (i) track "hot" pages by determining how often the accelerator memory access is going to a remote memory, such as processor memory circuitry and/or accelerator memory circuitry in one or more peer accelerator circuits; and/or (ii) track "cold" pages by determining how often accelerator memory access accesses data in local accelerator memory circuitry.

At 708, the migration circuitry 160 causes the transfer of a page from the processor memory circuitry 130 to the accelerator memory circuitry 180. In embodiments, the migration circuitry 160 may cause the transfer of the page responsive to the virtual address not found in the virtual-to-physical address translation circuitry 170 but being found in the processor memory circuitry 130.

At 710, the migration circuitry 160 causes an eviction of a page from the accelerator memory circuitry 180 to the processor memory circuitry 130. In embodiments, the migration circuitry 160 may cause the eviction of the page responsive to the processor circuitry 110 performing the memory access operation at the virtual address and the page being stored or otherwise retained in the accelerator memory circuitry 180. The method 700 concludes at 712. The figures below detail exemplary architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
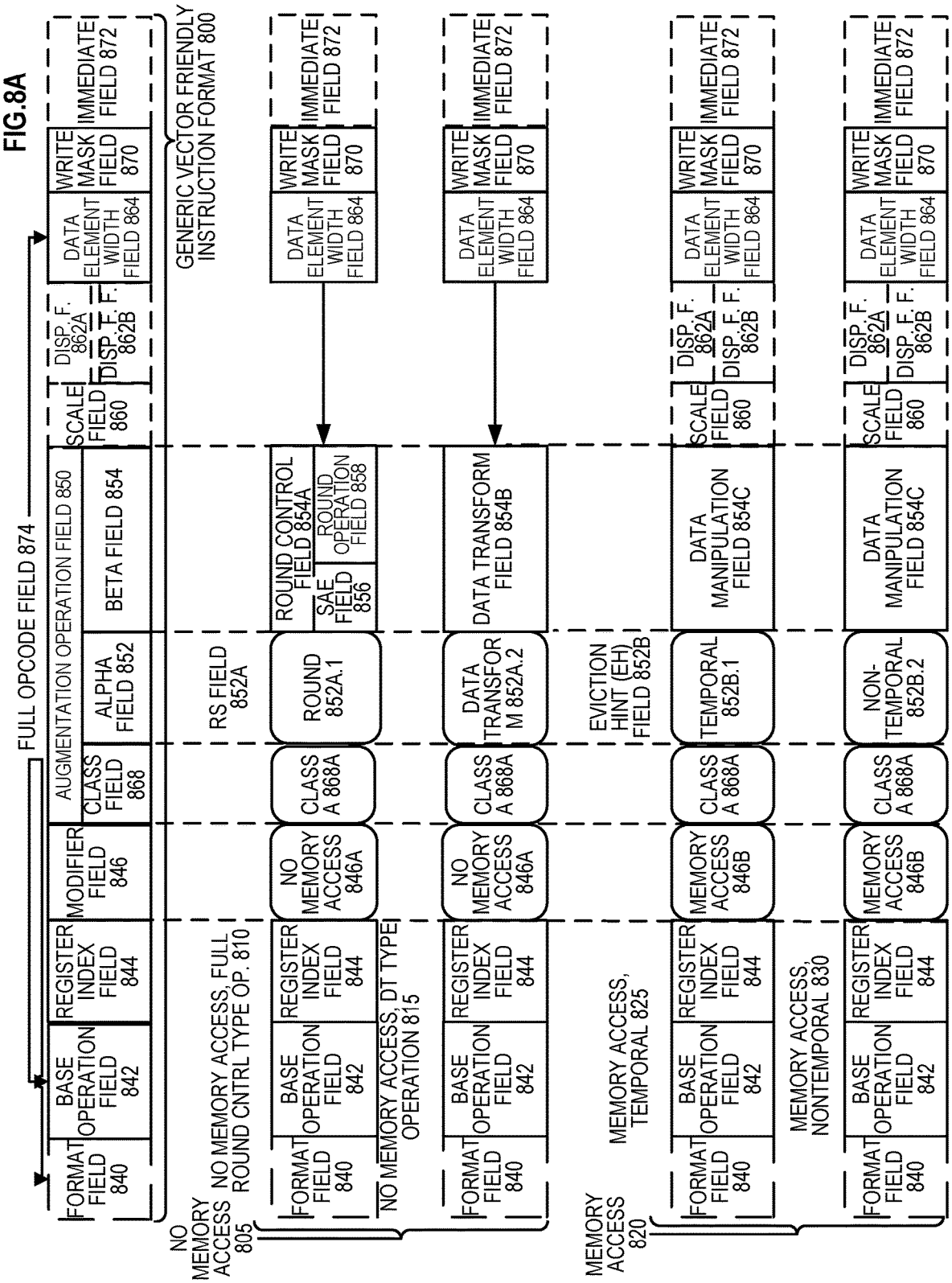
FIGS. 8A and 8B are block diagrams illustrating a generic vector friendly instruction format and instruction templates thereof according to embodiments of the invention.
Figure 8B:
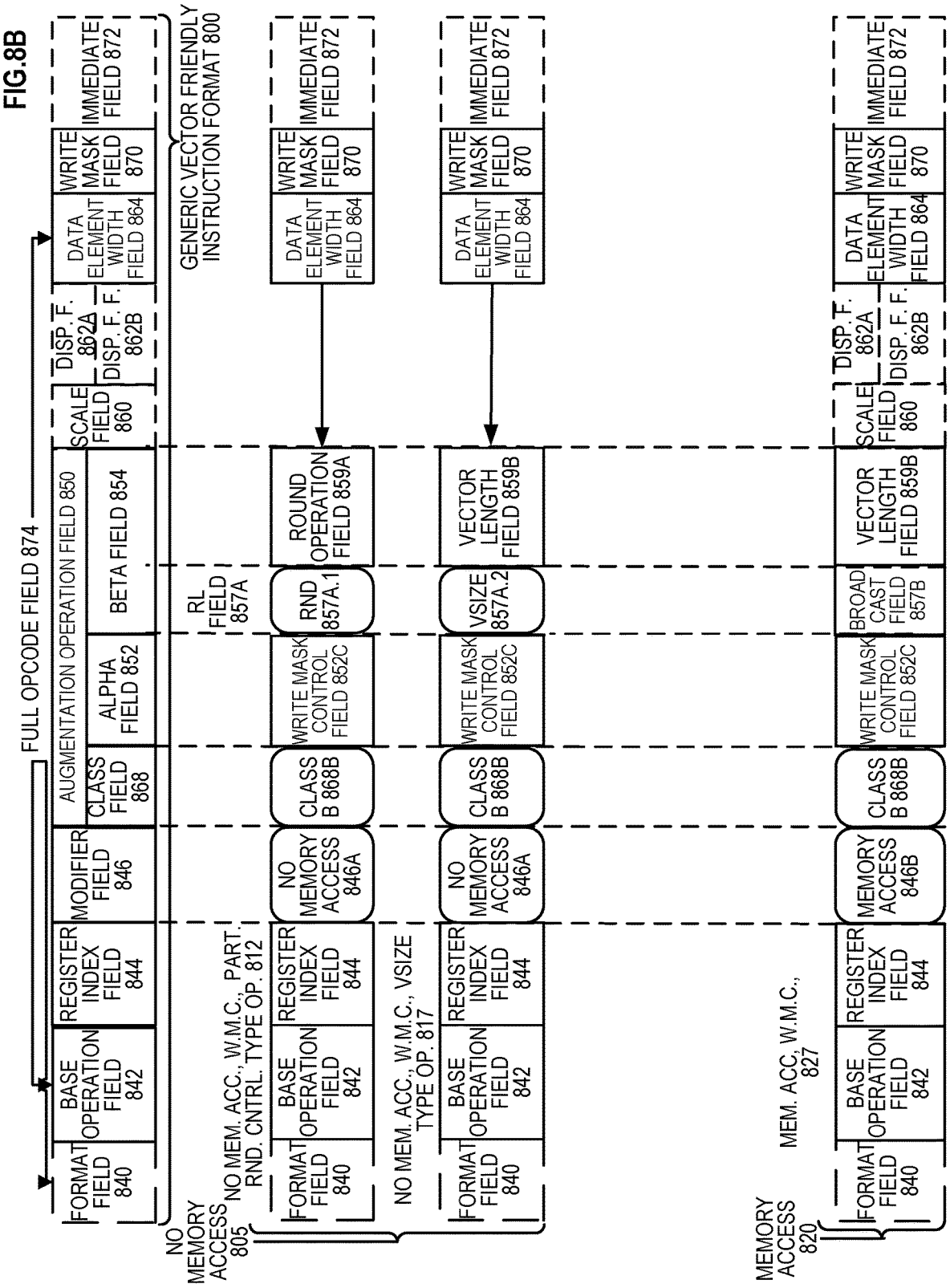

FIGS. 8A-8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A and 8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A and 8B, the contents of this field select between class A and class B instructions. In FIGS. 8A and 8B, rounded corner squares are used to indicate a specific value is present in a field (e.g., class A 868A and class B 868B for the class field 868 respectively in FIGS. 8A and 8B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the invention. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 8A and 8B into which the fields from FIG. 9 map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (OF, OF 38, or OF 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—If EVEX.U=0, it indicates class A or EVEX.U0; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field;

and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]—SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]–V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
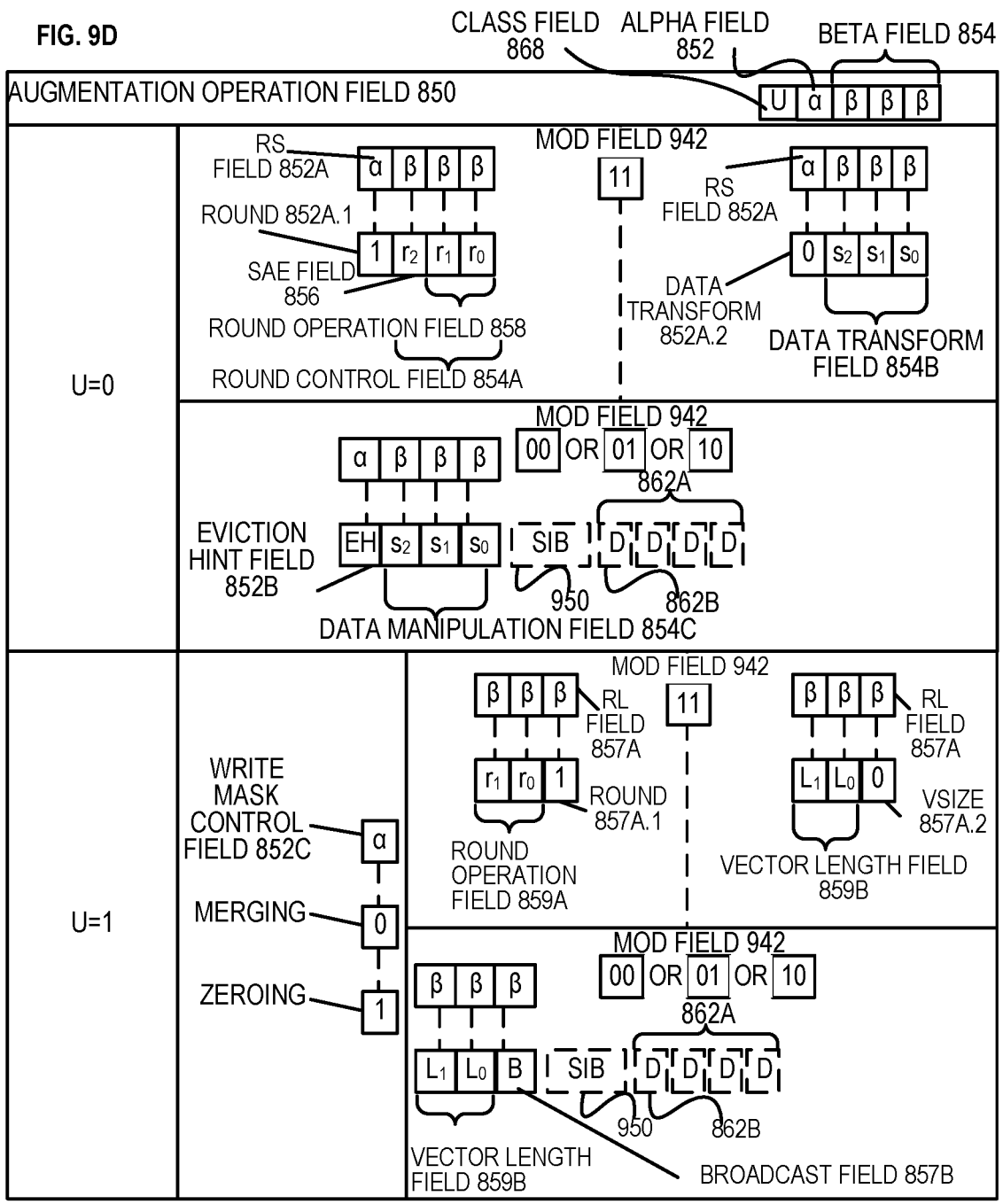

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2-1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Exemplary Register Architecture

Figure 10:
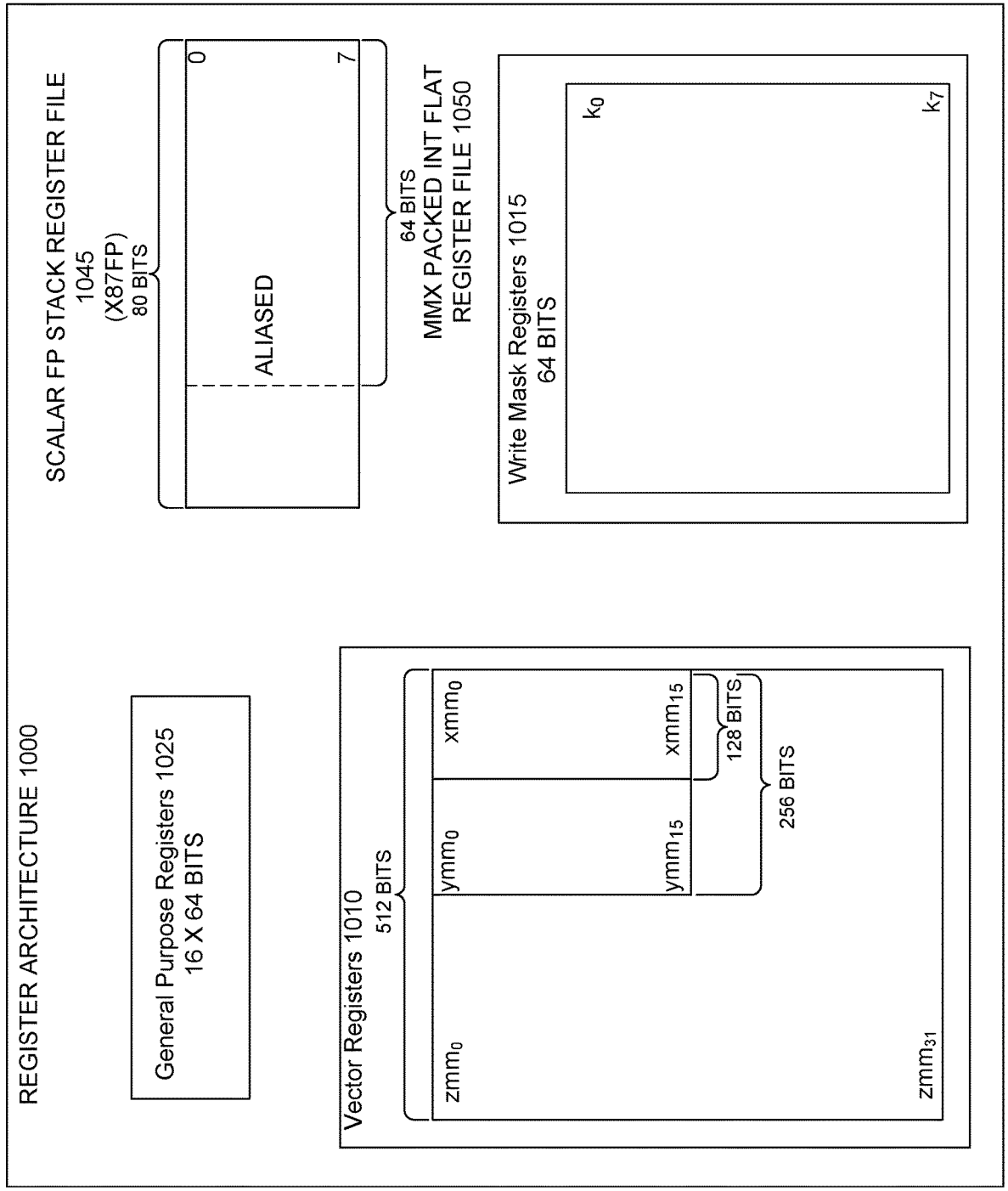
FIG. 10 is a block diagram of a register architecture according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| | A (FIG. 8A; U = 0) | 810, 815, 825, 830 | zmm registers (the vector length is 64 byte) |
| Instruction Templates that do not include the vector length field 859B | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A and 11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
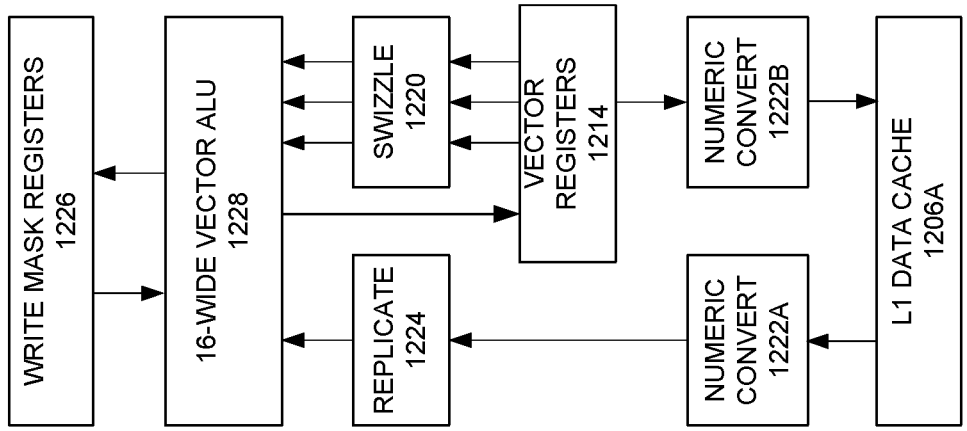
FIGS. 12A and B illustrate a block diagram of a more specific exemplary in-order core architecture, which core would be one of several logic blocks (including other cores of the same type and/or different types) in a chip.
Figure 12A:
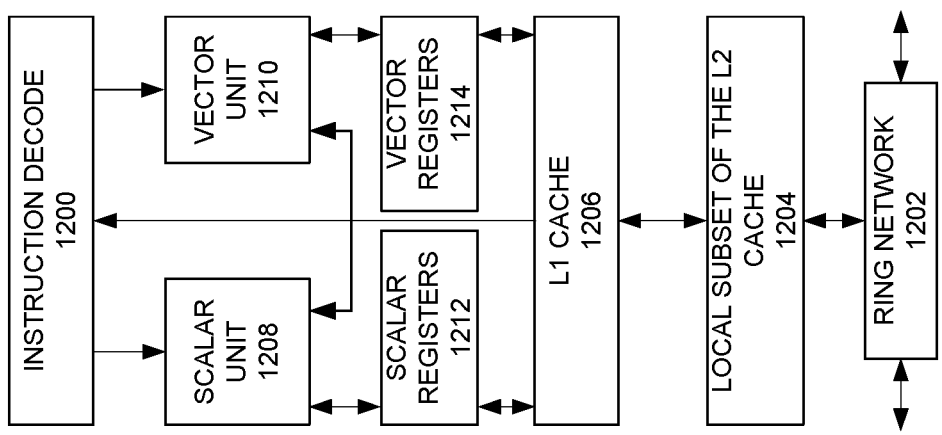

FIGS. 12A and 12B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
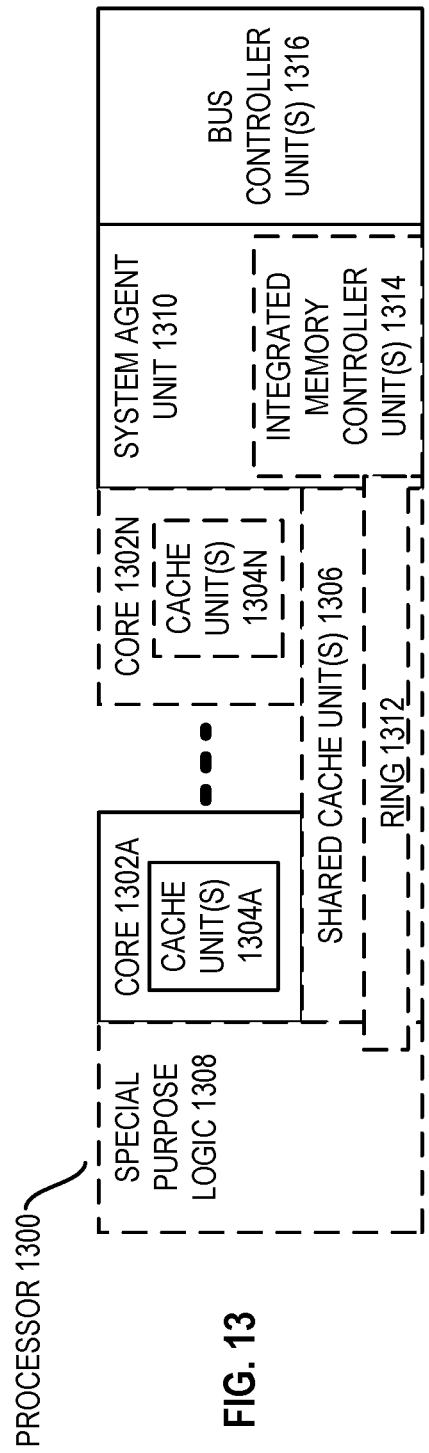
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIG. 14, FIG. 15, FIG. 16, and FIG. 17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
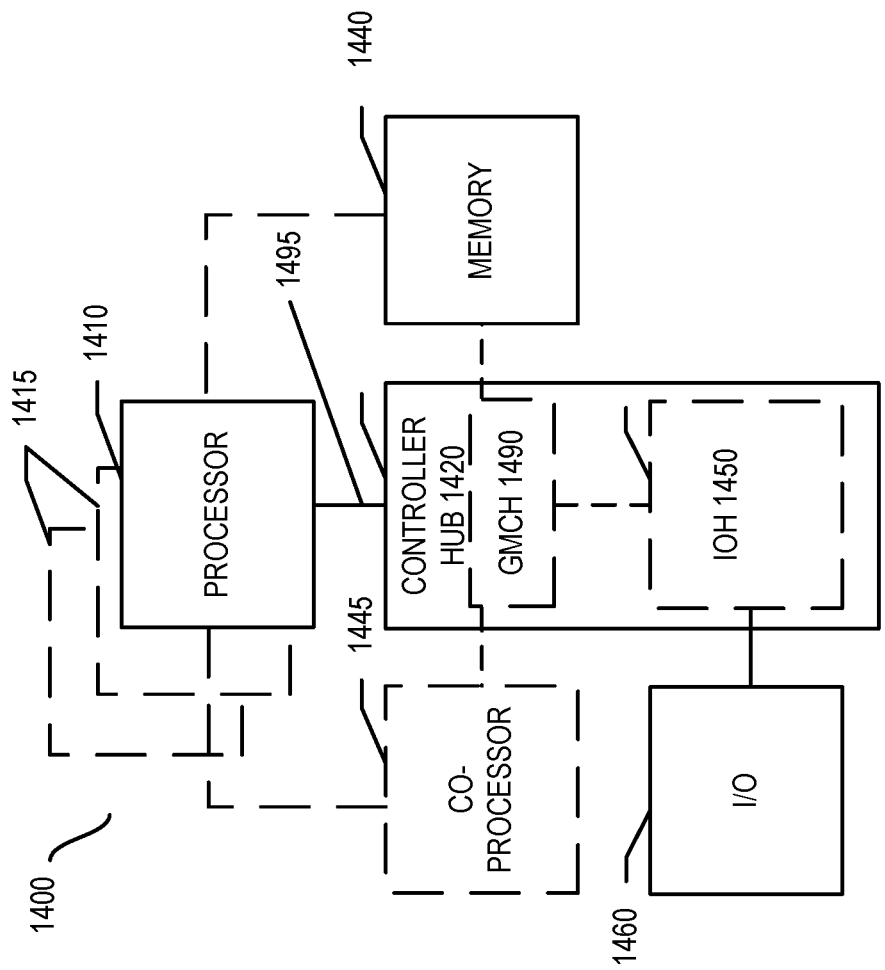
FIGS. 14, 15, 16, and 17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
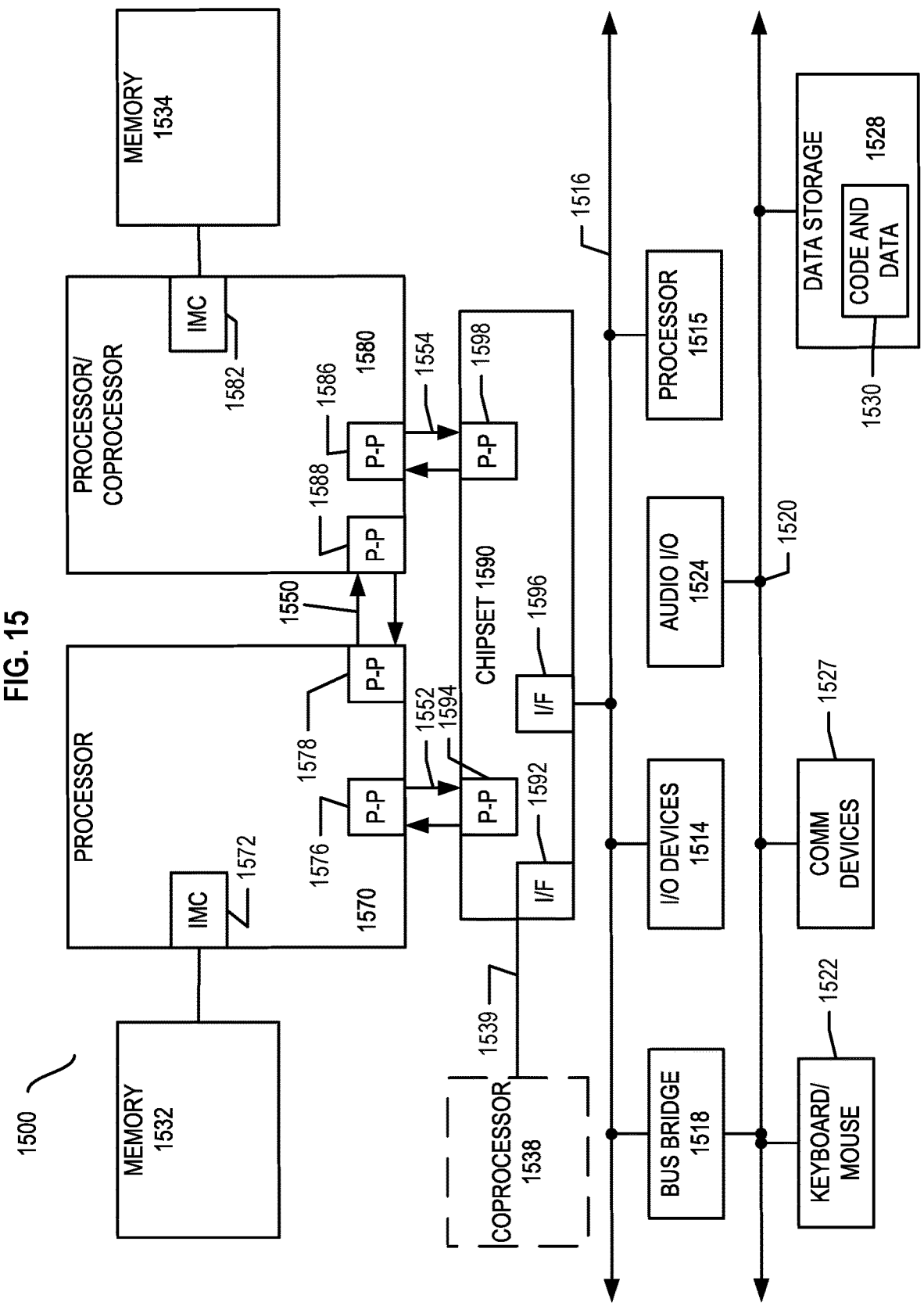

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
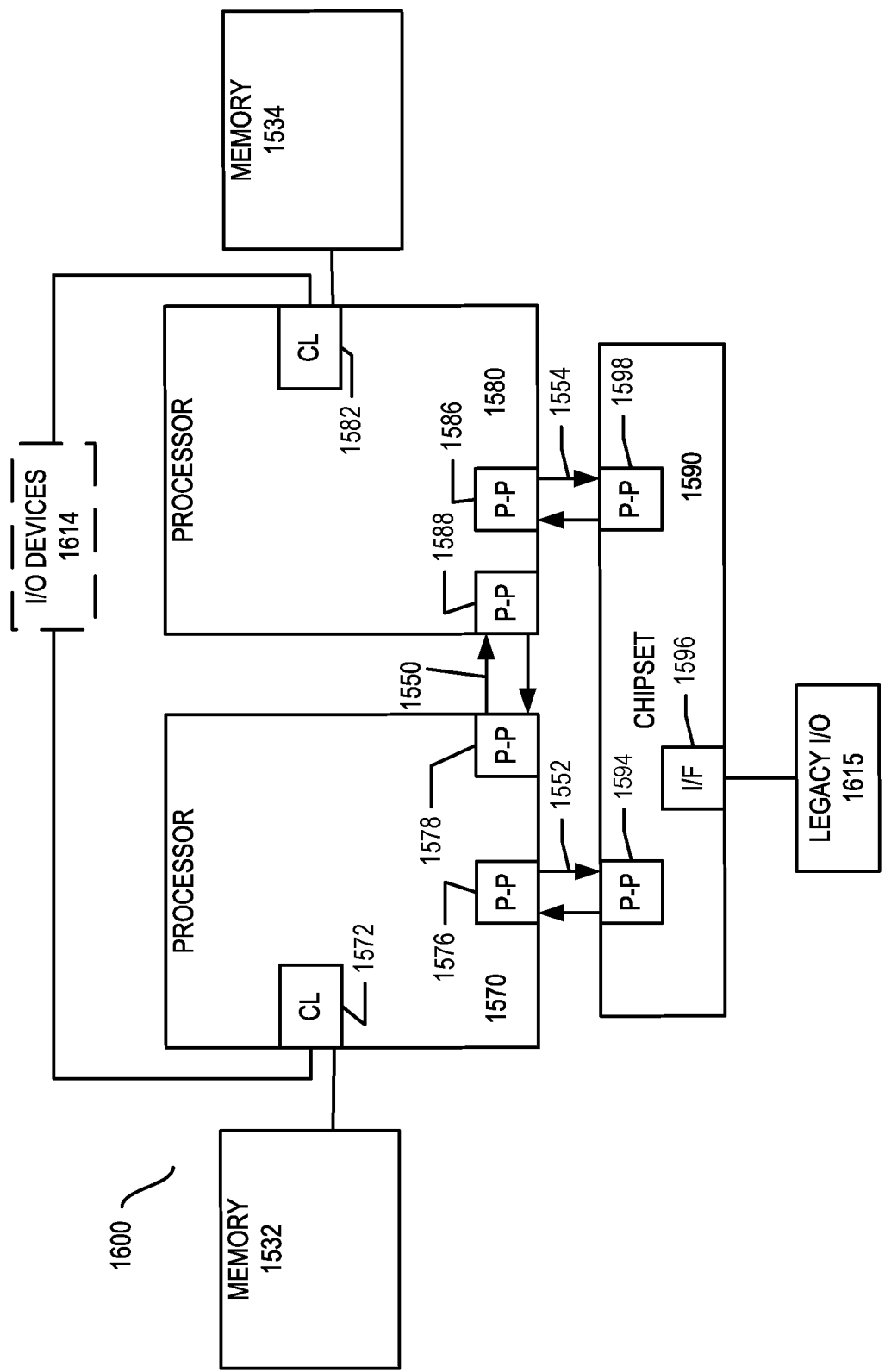

Referring now to FIG. 16, shown is a block diagram of a second more specific exemplary system 1600 in accordance with an embodiment of the present invention. Like elements in FIG. 15 and FIG. 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
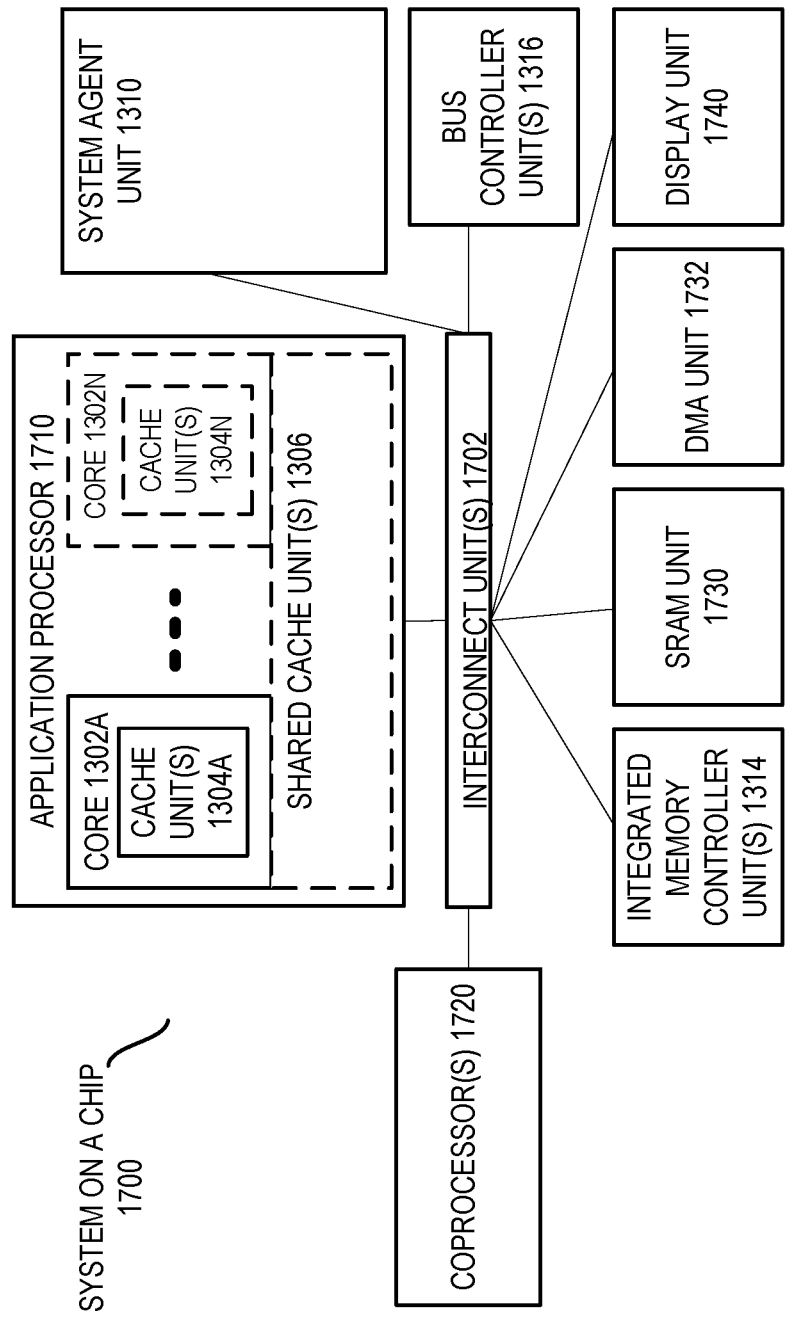

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
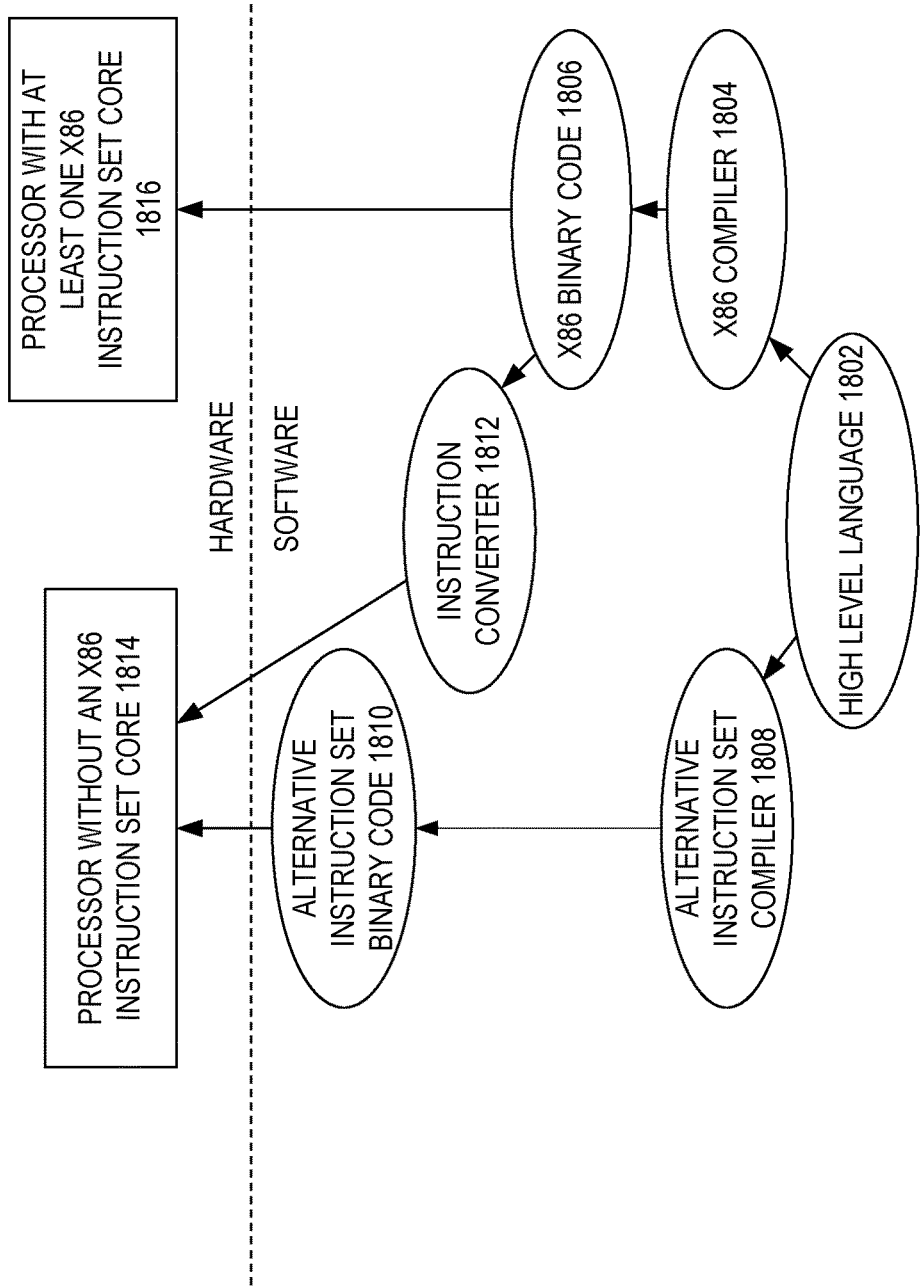
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

While FIG. 7 illustrates various operations according to one or more embodiments, it is to be understood that not all of the operations depicted in FIG. 7 are necessary for other embodiments. Indeed, it is fully contemplated herein that in other embodiments of the present disclosure, the operations depicted in FIG. 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods sharing memory circuitry between processor memory circuitry and accelerator memory circuitry in each of a plurality of peer-to-peer connected accelerator units. Each of the accelerator units includes virtual-to-physical address translation circuitry and migration circuitry. The virtual-to-physical address translation circuitry in each accelerator unit includes pages for each of at least some of the plurality of accelerator units. The migration circuitry causes the transfer of pages between the processor memory circuitry and the accelerator memory circuitry in each of the plurality of accelerator circuits. The migration circuitry migrates and evicts pages to/from accelerator memory circuitry based on statistical information collected by the virtual-to-physical address translation circuitry. Thus, the processor memory circuitry and accelerator memory circuitry may be dynamically allocated to advantageously minimize system latency attributable to data access operations.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for migrating and evicting pages to/from accelerator memory circuitry based on statistical information associated with virtual memory address-to-physical memory address translations performed by the virtual-to-physical address translation circuitry. By maintaining frequently used data proximate the point of use (e.g., data used by the accelerator circuitry is maintained in the accelerator memory circuitry), the systems and methods disclosed herein advantageously reduces system latency attributable to data transfers to/from local accelerator unit memory circuitry and peer accelerator unit memory circuitry.

According to example 1, there is provided an accelerator system. The system may include: at least one accelerator circuit; accelerator memory circuitry communicatively coupled to the at least one accelerator circuit, the accelerator memory circuitry to locally store a plurality of pages transferred from processor memory circuitry; accelerator virtual-to-physical address translation circuitry to translate a virtual address received from the at least one accelerator circuit to a physical memory address in one of: the processor memory circuitry or the accelerator memory circuitry; accelerator migration circuitry to: collect usage data associated with accesses to at least one of: processor memory circuitry or accelerator memory circuitry in one or more peer accelerator circuits; and cause the bidirectional transfer of data between the processor memory circuitry and the accelerator memory circuitry based, at least in part, on the collected usage data.

Example 2 may include elements of example 1 where the accelerator virtual-to-physical address translation circuitry may include: accelerator translation lookaside buffer (A-TLB) circuitry communicatively coupled to the at least one accelerator circuit, the A-TLB circuitry to store data representative of a plurality of virtual memory address-to-physical memory address translations; and accelerator memory management unit (A-MMU) circuitry communicatively coupled between the A-TLB circuitry and the accelerator memory circuitry, the A-MMU circuitry to store a plurality of pages to service virtual memory address-to-physical memory address translations associated with virtual memory addresses not found in the A-TLB circuitry.

Example 3 may include elements of examples 1 or 2 where the A-TLB circuitry to further: communicate to processor memory management unit circuitry (MMU) a virtual memory address-to-physical memory address translation service request associated with a virtual memory address not found in either the A-TLB circuitry or one of the plurality of page tables included in the A-MMU circuitry.

Example 4 may include elements of any of examples 1 through 3 where the A-MMU circuitry to further: perform one or more data transformation operations on data transferred to the accelerator memory circuitry.

Example 5 may include elements of any of examples 1 through 4 where the A-MMU circuitry to further: perform one or more data transformation operations that include at least one of: a compression operation, a decompression operation, an encoding operation, a decoding operation, an encryption operation, or a decryption operation on at least a portion of data transferred to the accelerator memory circuitry.

Example 6 may include elements of any of examples 1 through 5 where the accelerator migration circuitry may include: migration prediction circuitry to initiate a transfer of a page between processor memory circuitry and the accelerator memory circuitry; and page data mover circuitry to bidirectionally migrate pages between the processor memory circuitry and the accelerator memory circuitry responsive to receipt of a request, by the migration prediction circuitry.

Example 7 may include elements of any of examples 1 through 6 where the migration prediction circuitry initiates a transfer of the page between the processor memory circuitry and the accelerator memory circuitry based on a virtual memory address associated with a memory access operation.

Example 8 may include elements of any of examples 1 through 7 where the accelerator memory circuitry to locally store a plurality of pages transferred from processor memory circuitry for use by at least one of: the at least one accelerator circuit or at least one accelerator circuit disposed in a second accelerator system communicatively coupled to the accelerator system.

According to example 9, there is provided an electronic device. The electronic device may include: processor circuitry; processor memory management unit (MMU) circuitry; processor memory circuitry; at least one accelerator system, including: at least one accelerator circuit; accelerator memory circuitry communicatively coupled to the at least one accelerator circuit, the accelerator memory circuitry to locally store a plurality of pages transferred from processor memory circuitry; accelerator virtual-to-physical address translation circuitry to translate a virtual address received from the at least one accelerator circuit to a physical memory address in one of: the processor memory circuitry or the accelerator memory circuitry; and accelerator migration circuitry to: collect usage data associated with accesses to at least one of: processor memory circuitry or accelerator memory circuitry in one or more peer accelerator circuits; and cause the bidirectional transfer of data between the processor memory circuitry and the accelerator memory circuitry based, at least in part, on the collected usage data.

Example 10 may include elements of example 9 where the accelerator virtual-to-physical address translation circuitry may include: accelerator translation lookaside buffer (A-TLB) circuitry communicatively coupled to the at least one accelerator circuit, the A-TLB circuitry to store data representative of a plurality of virtual memory address-to-physical memory address translations; and accelerator memory management unit (A-MMU) circuitry communicatively coupled between the A-TLB circuitry and the accelerator memory circuitry, the A-MMU circuitry to store a plurality of pages to service virtual memory address-to-physical memory address translations associated with virtual memory addresses not found in the A-TLB circuitry.

Example 11 may include elements of any of examples 9 or 10 where the A-TLB circuitry to further: communicate to processor memory management unit circuitry (MMU) a virtual memory address-to-physical memory address translation service request associated with a virtual memory address not found in either the A-TLB circuitry or one of the plurality of page tables included in the A-MMU circuitry.

Example 12 may include elements of any of examples 9 through 11 where the A-MMU circuitry to further: perform one or more data transformation operations on data transferred to the accelerator memory circuitry.

Example 13 may include elements of any of examples 9 through 12 where the A-MMU circuitry to further: perform one or more data transformation operations that include at least one of: a compression operation, a decompression operation, an encoding operation, a decoding operation, an encryption operation, or a decryption operation on at least a portion of data transferred to the accelerator memory circuitry.

Example 14 may include elements of any of examples 9 through 13 where the accelerator migration circuitry may include: migration prediction circuitry to initiate a transfer of a page between processor memory circuitry and the accelerator memory circuitry; and page data mover circuitry to bidirectionally migrate pages between the processor memory circuitry and the accelerator memory circuitry responsive to receipt of a request, by the migration prediction circuitry.

Example 15 may include elements of any of examples 9 through 14 where the migration prediction circuitry initiates a transfer of the page between the processor memory circuitry and the accelerator memory circuitry based on a virtual memory address associated with a memory access operation.

Example 16 may include elements of any of examples 9 through 15 where the accelerator memory circuitry to locally store a plurality of pages transferred from processor memory circuitry for use by at least one of: the at least one accelerator circuit or at least one accelerator circuit disposed in a second accelerator system communicatively coupled to the accelerator system.

According to example 17, there is provided a processor acceleration method. The method may include: performing, by accelerator virtual address-to-physical address translation circuitry disposed in an accelerator unit, translation of one or more virtual memory addresses to one or more physical memory addresses; collecting, by accelerator migration circuitry, usage data associated with accesses to at least one of: processor memory circuitry or accelerator memory circuitry in one or more peer accelerator circuits; and causing, by the accelerator migration circuitry, a migration of one or more pages from processor memory circuitry to the accelerator memory circuitry based, at least in part, on the collected virtual memory address-to-physical memory address translation data.

Example 18 may include elements of example 17, and the method may further include: storing, by accelerator translation lookaside buffer (A-TLB) circuitry communicatively coupled to the at least one accelerator circuit, data representative of a plurality of virtual memory address-to-physical memory address translations; and storing, accelerator memory management unit (A-MMU) circuitry communicatively coupled between the A-TLB circuitry and the accelerator memory circuitry, a plurality of pages to service virtual memory address-to-physical memory address translations associated with virtual memory addresses not found in the A-TLB circuitry.

Example 19 may include elements of any of example 17 or 18, and the method may further include: communicating to processor memory management unit (P-MMU) circuitry a virtual memory address-to-physical memory address translation service request associated with a virtual memory address not found in either the A-TLB circuitry or one of the plurality of tables included in the A-MMU circuitry by the A-TLB circuitry.

Example 20 may include elements of any of examples 17 through 19, and the method may additionally include: performing, by the A-MMU circuitry, one or more data transformation operations on data transferred to the accelerator memory circuitry.

Example 21 may include elements of any of examples 17 through 20, and the method may additionally include: performing, by the A-MMU circuitry, one or more data transformation operations that include at least one of: a compression operation, a decompression operation, an encoding operation, a decoding operation, an encryption operation, or a decryption operation on at least a portion of data transferred to the accelerator memory circuitry.

Example 22 may include elements of any of examples 17 through 21 where collecting data associated with the plurality of virtual memory address-to-physical memory address translations performed by the accelerator virtual address-to-physical address translation circuitry comprises: collecting, by migration prediction circuitry, data associated with the plurality of virtual memory address-to-physical memory address translations performed by the accelerator virtual address-to-physical address translation circuitry; and where causing the migration of the one or more pages from the processor memory circuitry to the accelerator memory circuitry based, at least in part, on the collected virtual memory address-to-physical memory address translation data comprises: causing by the migration prediction circuitry, page data mover circuitry to migrate the one or more pages from the processor memory circuitry to the accelerator memory circuitry based, at least in part, on the collected virtual memory address-to-physical memory address translation data.

Example 23 may include elements of any of examples 17 through 22, and the method may additionally include: sharing, via an inter-accelerator fabric communicatively coupling each of a plurality of accelerator systems, at least a portion a plurality of pages stored in the accelerator memory circuitry with at least one other accelerator system included in the plurality of accelerator systems.

According to example 24, there is provided a processor acceleration system. The system may include: means for performing translation of one or more virtual memory addresses to one or more physical memory addresses; means for collecting usage data associated with accesses to at least one of: processor memory circuitry or accelerator memory circuitry in one or more peer accelerator circuits; and means for migrating one or more pages between processor memory circuitry and accelerator memory circuitry based, at least in part, on the collected virtual memory address-to-physical memory address translation data.

Example 25 may include elements of example 24, and the system may further include: means for storing data representative of a plurality of virtual memory address-to-physical memory address translations.

Example 26 may include elements of any of examples 24 or 25, and the system may further include: means for communicating a virtual memory address-to-physical memory address translation service request associated with a virtual memory address not found in stored data representative of a plurality of virtual memory address-to-physical memory address translations.

Example 27 may include elements of any of examples 24 through 26, and the system may further include: means for performing one or more data transformation operations on data transferred to the accelerator memory circuitry.

Example 28 may include elements of any of examples 24 through 27, and the system may further include: means for performing one or more data transformation operations that include at least one of: a compression operation, a decompression operation, an encoding operation, a decoding operation, an encryption operation, or a decryption operation on at least a portion of data transferred to the accelerator memory circuitry.

Example 29 may include elements of any of examples 24 through 28 where the means for collecting data associated with the plurality of virtual memory address-to-physical memory address translations performed by the accelerator virtual address-to-physical address translation circuitry comprises: means for collecting data associated with the plurality of virtual memory address-to-physical memory address translations; and where the means for causing the migration of the one or more pages from the processor memory circuitry to the accelerator memory circuitry based, at least in part, on the collected virtual memory address-to-physical memory address translation data comprises: means for migrating the one or more pages from the processor memory circuitry to the accelerator memory circuitry based, at least in part, on the collected virtual memory address-to-physical memory address translation data.

Example 30 may include elements of any of examples 24 through 29, and the system may additionally include: means for sharing at least a portion a plurality of pages stored in the accelerator memory circuitry with at least one other accelerator system included in the plurality of accelerator systems.

According to example 31, there is provided a non-transitory storage device. The non-transitory storage device may include includes instructions that, when executed by accelerator circuitry, causes the accelerator circuitry to: cause accelerator virtual address-to-physical address translation circuitry disposed in an accelerator unit to translate of one or more virtual memory addresses to one or more physical memory addresses; cause accelerator migration circuitry to collect usage data associated with accesses to at least one of: processor memory circuitry or accelerator memory circuitry in one or more peer accelerator circuits; and cause the accelerator migration circuitry, to migrate one or more pages from processor memory circuitry to accelerator memory circuitry based, at least in part, on the collected virtual memory address-to-physical memory address translation data.

Example 32 may include elements of example 31 where the instructions further cause the accelerator circuitry to: cause an accelerator translation lookaside buffer (A-TLB) circuitry communicatively coupled to the at least one accelerator circuit to store data representative of a plurality of virtual memory address-to-physical memory address translations; and cause accelerator memory management unit (A-MMU) circuitry communicatively coupled between the A-TLB circuitry and the accelerator memory circuitry to store a plurality of pages to service virtual memory address-to-physical memory address translations associated with virtual memory addresses not found in the A-TLB circuitry.

Example 33 may include elements of any of examples 31 or 32 where the instructions further cause the accelerator circuitry to: cause the A-TLB circuitry to communicate to processor memory management unit (P-MMU) circuitry a virtual memory address-to-physical memory address translation service request associated with a virtual memory address not found in either the A-TLB circuitry or one of the plurality of tables included in the A-MMU circuitry.

Example 34 may include elements of any of examples 31 through 33 where the instructions further cause the accelerator circuitry to: cause the A-MMU circuitry to perform one or more data transformation operations on data transferred to the accelerator memory circuitry.

Example 35 may include elements of any of examples 31 through 34 where the instructions further cause the accelerator circuitry to: cause the A-MMU circuitry to perform one or more data transformation operations that include at least one of: a compression operation, a decompression operation, an encoding operation, a decoding operation, an encryption operation, or a decryption operation on at least a portion of data transferred to the accelerator memory circuitry.

Example 36 may include elements of any of examples 31 through 35 where the instructions that cause the accelerator migration circuitry to collect data associated with the plurality of virtual memory address-to-physical memory address translations performed by the accelerator virtual address-to-physical address translation circuitry further cause the accelerator circuitry to: cause migration prediction circuitry, to collect usage data associated with accesses to at least one of: processor memory circuitry or accelerator memory circuitry in one or more peer accelerator circuits; and where the instructions that cause the accelerator migration circuitry to migrate the one or more pages from the processor memory circuitry to the accelerator memory circuitry based, at least in part, on the collected virtual memory address-to-physical memory address translation data further cause the accelerator circuitry to: cause page data mover circuitry to migrate the one or more pages from the processor memory circuitry to the accelerator memory circuitry based, at least in part, on the collected virtual memory address-to-physical memory address translation data.

Example 37 may include elements of any of examples 31 through 36 where the instructions further cause the accelerator circuitry to: share, via an inter-accelerator fabric communicatively coupling each of a plurality of accelerator systems, at least a portion a plurality of pages stored in the accelerator memory circuitry with at least one other accelerator system included in the plurality of accelerator systems.

According to example 38, there is provided an acceleration system, the system being arranged to perform the method of any of examples 17 through 23.

According to example 39, there is provided a chipset arranged to perform the method of any of examples 17 through 23.

According to example 40, there is provided least one machine-readable storage device that includes a plurality of instructions that, in response to be being executed on a computing device, cause the computing device to carry out the method according to any of examples 17 through 23.

According to example 41, there is provided a device that includes a plurality of peer-to-peer acceleration units coupled to processor circuitry, the device being arranged to perform the method of any of the examples 17 through 23.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. An accelerator system, comprising:
   at least one accelerator circuit;
   accelerator memory circuitry communicatively coupled to the at least one accelerator circuit, the accelerator memory circuitry to locally store a plurality of pages transferred from processor memory circuitry;
   accelerator virtual-to-physical address translation circuitry to translate a virtual address received from the at least one accelerator circuit to a physical memory address in one of: the processor memory circuitry or the accelerator memory circuitry, the accelerator virtual-to-physical address translation circuitry including;
      accelerator translation lookaside buffer (A-TLB) circuitry communicatively coupled to the at least one accelerator circuit, the A-TLB circuitry to store data representative of a plurality of virtual memory address-to-physical memory address translations; and
      accelerator memory management unit (A-MMU) circuitry communicatively coupled between the A-TLB circuitry and the accelerator memory circuitry, the A-MMU circuitry to store a plurality of pages to service virtual memory address-to-physical memory address translations associated with virtual memory addresses not found in the A-TLB circuitry;

accelerator migration circuitry to:
collect usage data associated with accesses to at least one of: the processor memory circuitry or the accelerator memory circuitry in one or more peer accelerator circuits; and
cause the bidirectional transfer of data between the processor memory circuitry and the accelerator memory circuitry based, at least in part, on the collected usage data.

2. The accelerator system of claim 1, the A-TLB circuitry to further:
communicate to processor memory management unit circuitry (MMU) a virtual memory address-to-physical memory address translation service request associated with a virtual memory address not found in either the A-TLB circuitry or one of the plurality of pages included in the A-MMU circuitry.

3. The accelerator system of claim 1, the A-MMU circuitry to further:
perform one or more data transformation operations on data transferred to the accelerator memory circuitry.

4. The accelerator system of claim 1, the A-MMU circuitry to further:
perform one or more data transformation operations that include at least one of: a compression operation, a decompression operation, an encoding operation, a decoding operation, an encryption operation, or a decryption operation on at least a portion of data transferred to the accelerator memory circuitry.

5. The accelerator system of claim 1 wherein the accelerator migration circuitry comprises:
migration prediction circuitry to initiate a transfer of a page between the processor memory circuitry and the accelerator memory circuitry; and
data mover circuitry to, at least one of:
bidirectionally migrate pages between the processor memory circuitry and the accelerator memory circuitry responsive to receipt of a request, by the migration prediction circuitry;
update the pages stored in the A-MMU circuitry; or
invalidate data stored in the A-TLB circuitry.

6. The accelerator system of claim 5 wherein the migration prediction circuitry initiates a transfer of data between the processor memory circuitry and the accelerator memory circuitry based on a virtual memory address associated with a memory access operation.

7. The accelerator system of claim 1, the accelerator memory circuitry to locally store a plurality of pages transferred from the processor memory circuitry for use by at least one of: the at least one accelerator circuit or at least one accelerator circuit disposed in a second accelerator system communicatively coupled to the accelerator system.

8. A processor acceleration method, comprising:
performing, by accelerator virtual address-to-physical address translation circuitry disposed in an accelerator circuit, translation of one or more virtual memory addresses to one or more physical memory addresses;
storing, by accelerator translation lookaside buffer (A-TLB) circuitry communicatively coupled to the accelerator circuit, data representative of a plurality of virtual memory address-to-physical memory address translations;
storing, by accelerator memory management unit (A-MMU) circuitry communicatively coupled between the A-TLB circuitry and accelerator memory circuitry, a plurality of pages to service virtual memory address-to-physical memory address translations associated with virtual memory addresses not found in the A-TLB circuitry;
collecting, by accelerator migration circuitry, usage data associated with accesses to at least one of: processor memory circuitry or the accelerator memory circuitry in one or more peer accelerator circuits; and
causing, by the accelerator migration circuitry, a migration of data from the processor memory circuitry to the accelerator memory circuitry based, at least in part, on the collected usage data associated with accesses to at least one of: the processor memory circuitry or the accelerator memory circuitry in one or more peer accelerator circuits.

9. The processor acceleration method of claim 8, further comprising:
communicating to processor memory management unit (P-MMU) circuitry a virtual memory address-to-physical memory address translation service request associated with a virtual memory address not found in either the A-TLB circuitry or one of the plurality of tables included in the A-MMU circuitry by the A-TLB circuitry.

10. The processor acceleration method of claim 8, further comprising
performing, by the A-MMU circuitry, one or more data transformation operations on data transferred to the accelerator memory circuitry.

11. The processor acceleration method of claim 8, further comprising:
performing, by the A-MMU circuitry, one or more data transformation operations that include at least one of: a compression operation, a decompression operation, an encoding operation, a decoding operation, an encryption operation, or a decryption operation on at least a portion of data transferred to the accelerator memory circuitry.

12. The processor acceleration method of claim 8, further comprising:
sharing, via an inter-accelerator fabric communicatively coupling each of a plurality of accelerator systems, at least a portion a plurality of data stored in the accelerator memory circuitry with at least one other accelerator system included in the plurality of accelerator systems.

13. A non-transitory storage device that includes instructions that, when executed by accelerator circuitry, causes the accelerator circuitry to:
cause accelerator virtual address-to-physical address translation circuitry disposed in an accelerator circuit to translate of one or more virtual memory addresses to one or more physical memory addresses;
cause an accelerator translation lookaside buffer (A-TLB) circuitry communicatively coupled to the accelerator circuit to store data representative of a plurality of virtual memory address-to-physical memory address translations;
cause accelerator memory management unit (A-MMU) circuitry communicatively coupled between the A-TLB circuitry and accelerator memory circuitry to store a plurality of pages to service virtual memory address-to-physical memory address translations associated with virtual memory addresses not found in the A-TLB circuitry;
cause accelerator migration circuitry to collect usage data associated with accesses to at least one of: processor memory circuitry or the accelerator memory circuitry in one or more peer accelerator circuits; and cause the accelerator migration circuitry, to migrate one or more pages from the processor memory circuitry to the accelerator memory circuitry based, at least in part, on the collected usage data associated with accesses to at least one of: the processor memory circuitry or the accelerator memory circuitry in one or more peer accelerator circuits.

14. The non-transitory storage device of claim 13, wherein the instructions further cause the accelerator circuitry to:

cause the A-TLB circuitry to communicate to processor memory management unit (P-MMU) circuitry a virtual memory address-to-physical memory address translation service request associated with a virtual memory address not found in either the A-TLB circuitry or one of the plurality of tables included in the A-MMU circuitry.

15. The non-transitory storage device of claim 13, wherein the instructions further cause the accelerator circuitry to:

cause the A-MMU circuitry to perform one or more data transformation operations on data transferred to the accelerator memory circuitry.

16. The non-transitory storage device of claim 13, wherein the instructions further cause the accelerator circuitry to:

cause the A-MMU circuitry to perform one or more data transformation operations that include at least one of: a compression operation, a decompression operation, an encoding operation, a decoding operation, an encryption operation, or a decryption operation on at least a portion of data transferred to the accelerator memory circuitry.

17. The non-transitory storage device of claim 13, wherein the instructions further cause the accelerator circuitry to:

share, via an inter-accelerator fabric communicatively coupling each of a plurality of accelerator systems, at least a portion of the data stored in the accelerator memory circuitry with at least one other accelerator system included in the plurality of accelerator systems.

18. A processor acceleration system, comprising:

means for performing translation of one or more virtual memory addresses to one or more physical memory addresses;

means for storing data representative of a plurality of virtual memory address-to-physical memory address translations in accelerator translation lookaside buffer (A-TLB) circuitry; and means for storing a plurality of pages to service virtual memory address-to-physical memory address translations associated with virtual memory addresses not found in the A-TLB circuitry in accelerator memory management unit (A-MMU) circuitry;

means for collecting usage data associated with accesses to at least one of: processor memory circuitry or accelerator memory circuitry in one or more peer accelerator circuits; and means for migrating data between the processor memory circuitry and the accelerator memory circuitry based, at least in part, on the collected usage data associated with accesses to at least one of: the processor memory circuitry or the accelerator memory circuitry in one or more peer accelerator circuits.

19. The processor acceleration system of claim 18, further comprising:

means for storing data representative of a plurality of virtual memory address-to-physical memory address translations.

20. The processor acceleration system of claim 18, further comprising:

means for communicating to a processor memory management unit a virtual memory address-to-physical memory address translation service request associated with a virtual memory address not found in the A-MMU circuitry.

* * * * *